(12) United States Patent
Serizawa et al.

(10) Patent No.: US 6,878,058 B1
(45) Date of Patent: *Apr. 12, 2005

(54) IMAGE PROCESSOR AND GAME DEVICE WITH IMAGE PROCESSOR

(75) Inventors: Narito Serizawa, Tokyo (JP); Kenji Kanno, Tokyo (JP)

(73) Assignee: Sega Enterprises, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,863

(22) PCT Filed: May 10, 1996

(86) PCT No.: PCT/JP96/01248

§ 371 (c)(1),
(2), (4) Date: Jan. 7, 2002

(87) PCT Pub. No.: WO96/36016

PCT Pub. Date: Nov. 14, 1996

(30) Foreign Application Priority Data

May 11, 1995 (JP) .............................. 7-113465

(51) Int. Cl.$^7$ ................................ A63F 9/24
(52) U.S. Cl. ................ 463/8; 700/92; 340/323 R
(58) Field of Search .................. 463/1–8, 30–33, 463/48; 434/307 R; 340/323 R; 364/410.1, 411.1; 273/293, 298, 440, 440.1, 460–461, 459, DIG. 26; 235/1 R, 1 B, 78 G, 88 G; 700/91–92

(56) References Cited

U.S. PATENT DOCUMENTS 4,491,324 A * 1/1985 Yoshida .......................... 463/8
4,738,451 A * 4/1988 Logg ............................. 463/2
5,137,277 A * 8/1992 Kitaue .......................... 463/2
5,580,308 A * 12/1996 Nakamura .................... 463/7

FOREIGN PATENT DOCUMENTS

| EP | 0634727 A | * | 1/1995 | |
| EP | 0 634 727 A2 | | 1/1995 | |
| GB | 2106789 A | * | 4/1983 | ...... 273/FOR 85 G |
| GB | 2163929 A | * | 3/1986 | ...... 273/FOR 85 G |
| JP | 05-027989 | * | 7/1993 | |
| JP | 07-065205 | * | 3/1995 | |
| WO | WO 94/09813 | * | 12/1994 | |
| WO | WO 94/29813 | | 12/1994 | |

OTHER PUBLICATIONS

DOOM (TM) Instruction Booklet, by Williams Entertainment, Copyright 1993, pp. 3–4, 7–10, 29–30 and covers.*

(Continued)

*Primary Examiner*—Mark Sager
(74) *Attorney, Agent, or Firm*—Morrison & Foerster LLP

(57) ABSTRACT

An image processor for achieving an effective image processing when realizing a play simulating a reality such as a fighting game. A data processor comprises a display 3a, a control panel 4a, a speaker 11a and a speaker 11a and a game processing board 10a. Fighters C1 and C2 are displayed on the display 3a. When the joy sticks 41am and 41ah of the control panel 4a are operated, the operating data is input to the game processing board 10a. The game processing board 10a performs an image processing of the fighters C1 and C2 based on the operating signal, forms video signals based on the image processed result and displays them on the display 3a as the fighters C1 and C2. The game processing board 10a realizes a polygon forming means so that the head of the fighter C2 is constituted of a minimum number of polygons, and increases the number of polygons of the head when the part of a display member composed of a minimum number of polygons is transformed and displayed.

4 Claims, 18 Drawing Sheets

OTHER PUBLICATIONS

"Modelling and Animating Faces Using Scanned Data", Journal of Visualization and Computer Animation, by Waters et al, vol. 2, No. 4, pp. 123–128, Jun. 1991.*

"PIXEL Extra Game World", Computer Graphics Information Center, pp. 6–7, Sep. 1993.*

Wizard's Crown Player Guide by Strategic Simulations, Inc., pp. 1986.*

The Dark Heart of Uukrul Player Guide, by Digital Studios, Ltd., pp. 2.8–9,12–14, 22, 29–33. 1989.*

The Bard's Tale Mannalby Electronic Arts, pp. 1,5,7,13, cover and Command Summary pp. 2 and 5. 1985.*

"Modelling and Animating Faces Using Scanned Data" by Waters K. et al. Journal of Visualization and Computer Animation vol. 2, No. 4, p. 123–128 XP002052451 p. 124, left-hand column, line 55–right-hand column, line 13.

Waters et al., "Modelling an Animated Faces Using Scanned Data", Jouranl of Visualization and Computer Animation, Jun. 1991 John Wiley & Sons, Ltd., pp. 123–128.

* cited by examiner

IMAGE PROCESSOR AND GAME DEVICE WITH IMAGE PROCESSOR

FIELD OF THE INVENTION

The present invention relates to an image processor and a game device provided with this image processor, and more particularly to an image processor for carrying out an image processing for a game such as a fighting game and a game device for carrying out this game.

BACKGROUND ART

With the development of recent computer graphic technique, image processors such as game devices or simulation devices have been commonly and widely popularized. For example, the game devices include peripherals (peripheral equipments) such as a joy stick (an operating rod), a button, a monitor, etc., and a game device main body for executing a data communication with the peripherals, an image processing, an acoustic processing and the like. Since the image processing plays an extremely important role to improve the value of goods, a technique for reproducing animated images also has been recently improved to obtain a high definition.

As an example of the game devices, "Title Fight (trade mark) produced by Sega Enterprises Co. Ltd." has been known. In this game device, a character (fighter) is constituted of a sprite (a picture) and a background or the like is constituted of a scroll image plane.

However, in the case of the above mentioned example, the image plane of a character or the like cannot be represented by changing a viewpoint. Thus, recently, a three-dimensional form has been composed of a plurality of polygons and a texture (pattern) has been mapped on the polygons so that the character can be displayed even when it is viewed from a predetermined viewpoint.

As an example of the devices as mentioned above, there has been known a TV game device (For example, a fighting game of "Virtual Fighter (™)" produced by Sega Enterprises Co., Ltd.) in which a picture is drawn using polygon data obtained by applying a texture mapping process to a three-dimensional character, a special background part which requires a movement meeting the movement of the character or the change of a viewpoint is also drawn using polygon data with a texture and a background except the above described background is drawn by a scroll image plane. In this case, the coordinate transformation and perspective transformation of the polygon data with texture which forms the character and a special part of its background are carried out depending on the movement of the character or the change of a viewpoint and a picture is drawn for every frame.

Thus, the character (for example, the above described fighter) and a special part of the image plane of the background (for example, a ring for the above described fighter) closely connected with the movement of the character can be more three-dimensionally represented when viewed from a predetermined viewpoint than a case in which the character is constituted of a sprite or a scroll image plane.

In the image processor such as the above mentioned conventional TV game device, the coordinate transformation for every frame following the movement of the character or the change of a point of view and the throughput of texture mapped data have been enormously increased. Accordingly, the computing load of the CPU of a data processor main body such as a TV game device main body has been extremely increased. In order to cope with the increase of the computing load, a CPU having a high computing capacity has been required, which has caused a production cost to be raised.

Thus, when a CPU having a tolerable processing capability is used and image data is to be processed at rather high speed, for example, the number of characters or the amount of processing of texture mapping needs to be limited. Therefore, the degree of freedom of manufacturing software is suppressed and it becomes difficult to improve an image quality.

Further, since the degree of freedom in manufacturing has been suppressed, the amusement of a game has been inconveniently and insufficiently expressed.

As a result, in the conventional game device using a polygon, it has been attempted to limit the number of polygons which can be used when an image processing program is created, while using a CPU having a tolerable capacity in order to solve the above mentioned problems. In the conventional example, it has been taken into consideration that more polygons are allocated to a part of a display member composed of polygons, for example, a desired part such as an entire character or the head of the character and the number of polygons of other parts is limited so as to effectively employ the number of polygons. However, according to the conventional technique, since the number of polygons of a part to which more polygons are allocated has been maintained as they are in all image processes, it has been impossible to always effectively employ the number of polygons.

Further, according to the conventional game device, since an operating mechanism is actuated so that the movement of a fighter is controlled, it is sometimes decided that a high score is obtained relative to a rival fighter only by frequently and indiscriminately operating the operating mechanism. Consequently, a state different from a real situation has occurred, and therefore a game environment full of a realistic feeling has been hardly provided. On the other hand, if the operation of the operating mechanism is effective, a high score will have to be obtained. However, according to the conventional game device, it has been difficult to discriminate the movement of the operating mechanism to be effective in continuing a game or to be disorderly and indiscriminate.

Still further, in the conventional game device, a plurality of characters are respectively composed of polygons. When the plurality of characters are superimposed together with respect to a viewpoint, a higher priority has been given to a polygon in the front side of the viewpoint so that the polygon in the front side of the viewpoint has been displayed with higher priority than other polygons. As a result, in the case of a fighting game in which a plurality of fighters appear, the back part of a fighter situated in the front side on an image plane has been displayed and other following fighters have not been inconveniently displayed. When the fighter who is a character in the front side is an object to be operated by a player, if the image of an opponent fighter is not displayed, the object to be operated will not be possibly effectively controlled. In this case, although a higher display priority may be given to the polygons of the opponent character, no display of the fighter in the front side who is an object to be operated by the player would make the operation of the fighter difficult.

Additionally, according to the conventional game device, the lifetime of the fighter who is a display member has been displayed on a part of a display as a life counter (lifetime measuring means) and presented to the player. Thus, when the life counter indicates a predetermined value or lower, the game in the game device has finished. For example, in the case of the above described Virtual Fighter (™), when one fighting scene is finished and a new fighting scene is opened, a life count value having the same amount (length) as that of a former scene has been prepared. That is, when the fighters actually fight together, damage given to the fighters are directly accumulated even when the fighting scene is updated. Therefore, there has been a defect that the state of the actual fighting is not accurately reflected on the game device.

In other words, the image processor such as the above mentioned conventional game device has a problem that an effective image processing cannot be achieved when an actuality simulated play, for example, a fighting, is conducted.

Accordingly, the present invention was made to solve the problem. It is a first object of the present invention to provide an image processor capable of effectively using the limited number of polygons.

It is a second object of the present invention to provide an image processor in which a realistic feeling is more expressed by considering a fact that, for example, damage or fatigue applied to a fighter is actually accumulated.

It is a third object of the present invention to provide an image processor in which even if a plurality of display members are superimposed together with respect to a viewpoint, when the display members such as a plurality of characters are related together and subjected to an image processing, the display members can be effectively controlled by simultaneously displaying the plurality of display members.

It is a fourth object of the present invention to provide to an image processor in which a discrimination between the indiscriminate and frequent operation of an operating mechanism and the effective operation of an operating mechanism are effectively made, so that a high evaluation based on the disordered operation of the operating mechanism is prevented from being given.

It is also a fifth object of the present invention to provide a game device provided with the image processor attaining these objects.

DISCLOSURE OF INVENTION

In order to attain the first object, an image processor according to the present invention described in claim 1 comprising a data processor including operating means for outputting an operating signal for operating display member displayed on a display means, an image processing means for carrying out an image processing for displaying the display member on the display means based on the operating signal and a video means for forming a video signal based on the image processed result from the image processing means and outputting it to the display means is characterized in that the image processing means increases the number of polygons forming the display member when the display member is transformed and displayed.

The invention according to claim 2 is characterized in that the image processing means comprises a polygon forming means for forming at least one of the display member of a minimum number of polygons and a polygon number increasing means for increasing the number of polygons forming the part of the display member when the part of the display member composed of the minimum number of polygons is transformed and displayed and a transformation processing means for performing an image processing for displaying the transformation of the one part of the display member composed of the minimum number of polygons based on the increased number of polygons.

The invention according to claim 3 is characterized in that the polygon forming means comprises a first means for forming a part of the display member in the shape of a polyhedron each face of which is formed with one polygon, and the polygon number increasing means comprises a second means for increasing each face of the polyhedron so as to be formed with a plurality of polygons when a part of the display member is transformed and displayed.

The invention according to claim 4 is characterized in that the image processing means includes a first character and a second character respectively simulating the display member and comprises a collision deciding means for deciding the collision of the head of the first character and the second character, the polygon forming means forms the head of the first character in the shape of a hexahedron each face of which is composed of one polygon, the polygon number increasing means increases the number of polygons of each face of the hexahedron when the decision of collision by the collision deciding means is affirmed and the transformation or deformation processing means carries out an image processing for transforming the head based on the increased number of polygons.

The invention according to claim 5 is characterized in that each face of the head is formed in a rectangular shape which can be composed of one polygon.

In order to achieve the second object, an image processor according to the present invention described in claim 6 comprising a data processor including an operating means for outputting an operating signal for operating a display member displayed on a display means, an image processing means for carrying out an image processing for displaying the display member on the display means based on the operating signal, a video means for forming a video signal based on the image processed result from the image processing means and outputting it to the display means and an image processed surplus power display means for displaying a surplus power in an image processing which is given to the display member as a video image, is characterized in that the image processed surplus power display means comprises a whole surplus power display means for displaying a whole surplus power, a display means for a remaining surplus power relative to the whole surplus power and a whole surplus power changing means for gradually changing the whole surplus power as the image processing progresses.

The invention according to claim 7 further comprises a storing means for storing gradually decreased values of the whole surplus power and is characterized in that the whole surplus power changing means sequentially reads whole surplus powers corresponding to values from the storing means in accordance with an image processed state so that the whole surplus power is decreased.

The invention according to claim 8 is characterized in that the whole surplus power in the image processing indicates a life count value given to a character as the display member.

In order to attain the third object, an image processor according to the present invention described in claim 9 comprising a data processor including an operating means for outputting an operating signal for operating a plurality of display members on a display means, an image processing means for carrying out an image processing for displaying the display members on the display means based on the operating signal, and a video means for forming a video signal based on the image processed result from the image processing means and outputting it to the display means, characterized in that the image processing means comprises a polygon forming means for forming the display members with polygons, an image forming means for forming the images of the display members viewed from a predetermined viewpoint and a perspectively processing means for perspectively processing a part of the polygons of the display member located in the front side of the viewpoint.

The invention according to claim 10 is characterized in that the perspectively processing means applies a mesh processing to a relevant polygon.

In order to achieve the fourth object, an image processor according to the present invention described in claim 11 comprising a data processor including an operating means for outputting an operating signal for operating a display member displayed on a display means, an image processing means for carrying out an image processing for displaying the display member on the display means based on the operating signal and a video means for forming a video signal based on the image processed result from the image processing means and outputting it to the display means, is characterized in that the image processing means comprises a deciding means for deciding whether an operation meeting a predetermined regulation is input to the operating means or not and a suppressing means for suppressing the degree of image processing applied to the display member when the result of decision by the deciding means is that the operation meeting the regulation is not input to the operating means.

In order to attain the fifth object, a game machine according to the present invention described in claim 12 comprises a display means and an image processor according to any one of claims 1 to 10.

In the image processor according to claim 1, when the display member is transformed or deformed and displayed by the image processing means, the number of polygons for forming the display member is increased. Therefore, as in the image processor according to claim 2, when the polygon forming means forms at least a part of the display member with a minimum number of polygons and the part of the display member formed with the minimum number of polygons does not need to be transformed nor displayed, the number of polygons is maintained. On the other hand, when the part of the display member needs to be transformed or deformed, the number of polygons of the part is increased by the polygon number increasing means. Accordingly, when the part does not need to be transformed, an extra number of polygons can be applied to be other display members, so that the number of polygons can be effectively employed.

Further, the number of polygons is increased so that the display member can be transformed and displayed, or the transformed display member can be more specifically displayed. When this part has to be transformed, the number of polygons of the part is increased, and therefore, the number of polygons of other display members is limited. However, the attention of audience is paid to the transformed part, an inconvenience due to the limitation may be reduced.

In the device according to claim 3, the polygon forming means forms a part of the display member in the shape of a polyhedron each face of which is composed of one polygon and the polygon number increasing means increases the number of polygons of each face of the polyhedron to have a plural number, when a part of the display member is transformed and displayed. In such a way, the number of polygons can be reduced as much as possible by using the polyhedron, and when the polyhedron needs to be transformed and displayed, the number of polygons of each face is increased.

In the device according to claim 4, the image processing means forms the display member comprising the first and second characters respectively simulating the body and decides the collision of the head of the first character with the second character so that it assuredly grasps a case where the head needs to be transformed. The polygon forming means forms the head of the first character in the shape of a hexahedron each face of which is composed of one polygon. Further, when the decision of collision is affirmed, the polygon number increasing means increases the number of polygons of each face of the hexahedron so that the transformation of the head can be displayed.

In the invention according to claim 5, each face of the head of the character is formed in a rectangular shape which can be composed of one polygon, so that when the head has not to be transformed, the number of polygons of each face of the head is minimized.

In the device according to claim 6, the image processed surplus power display means gradually changes a whole surplus power as an image processing advances so that the image processed result influences a surplus power in an image processing. Herein, the whole surplus power is sequentially decreased, so that a damage actually stored in that a display member can be accurately reproduced, for example, in an image processing in a fighting game.

In the invention according to claim 7, the storing means stores the gradually decreased values of the whole surplus power. The whole surplus power changing means gradually reads the whole surplus powers corresponding to values from the storing means in accordance with image processed states and outputs them to the display means. Therefore, the whole surplus power can be assuredly changed in accordance with the image processed state.

In the device according to claim 8, the whole surplus power in an image processing is supplied to the character as the display member as a life count value and an audience can previously know the remaining lifetime of the character whom he can control.

In the invention according to claim 9, the display member is composed of polygons and, when the image of the display member viewed from a predetermined viewpoint is formed, a part of the polygons of the display member located in the front side of the viewpoint is subjected to a perspective processing. Then, even when a plurality of display members are superimposed together with respect to the viewpoint on a three-dimensional coordinate, a part of the polygons located in the front side of the viewpoint is perspectively processed, so that the remaining display members can be displayed on the display means while the existence of the polygons in the front side can be maintained. Accordingly, since the audience can recognize the display members composed of a plurality of polygons superimposed together with respect to the viewpoint, while a plurality of display members can be freely displayed on the display means by viewing them from a desired viewpoint, he can surely operate the operating means. This perspective processing is realized by a mesh processing described in claim 10.

According to the device described in claim 11, whether an operation meeting a predetermined regulation, like a rule in the case of a fighting game, is input to the operating means or not is decided and when the result of decision is that the operation meeting the regulation is not input to the operating means, the degree of image processing applied to the display member is suppressed. As a result of this suppression, a part or all of the image processing is nullified, or a processing such as the decrease of the above mentioned remaining image processed surplus power applied to the display member to be operated is realized. Thus, a high evaluation due to the disordered operation of the operating mechanism is prevented from being given.

In the invention according to claim 12, a display means and the above described image processor are provided so that a game play in which an effective image processing can be done is provided in achieving a play simulating a reality such as a fighting game.

The invention according to claim 13 concerns a storing medium in which procedures for executing the above mentioned means by a computer are stored. The storing means includes, for example, a floppy disk, a magnetic tape, a magnet-optical disk, a CD-ROM, a DVD, a ROM-cartridge, a RAM-cartridge, a RAM cartridge with battery backup, a non-volatile RAM-cartridge, etc. The storing medium means a medium in which information (mainly, digital data, program) is stored by any physical means, and which enables a processor such as computer, a private processor or the like to carry out a predetermined function.

BEST MODE FOR CARRYING OUT THE INVENTION

Referring to FIGS. 1 to 9, an embodiment of the present invention will be described. In this embodiment, a case in which an image processor of the present invention is applied to a boxing type fighting game device as a kind of fighting games will be described. This game device is provided with a computer for realizing the respective means of the present invention.

Figure 1:
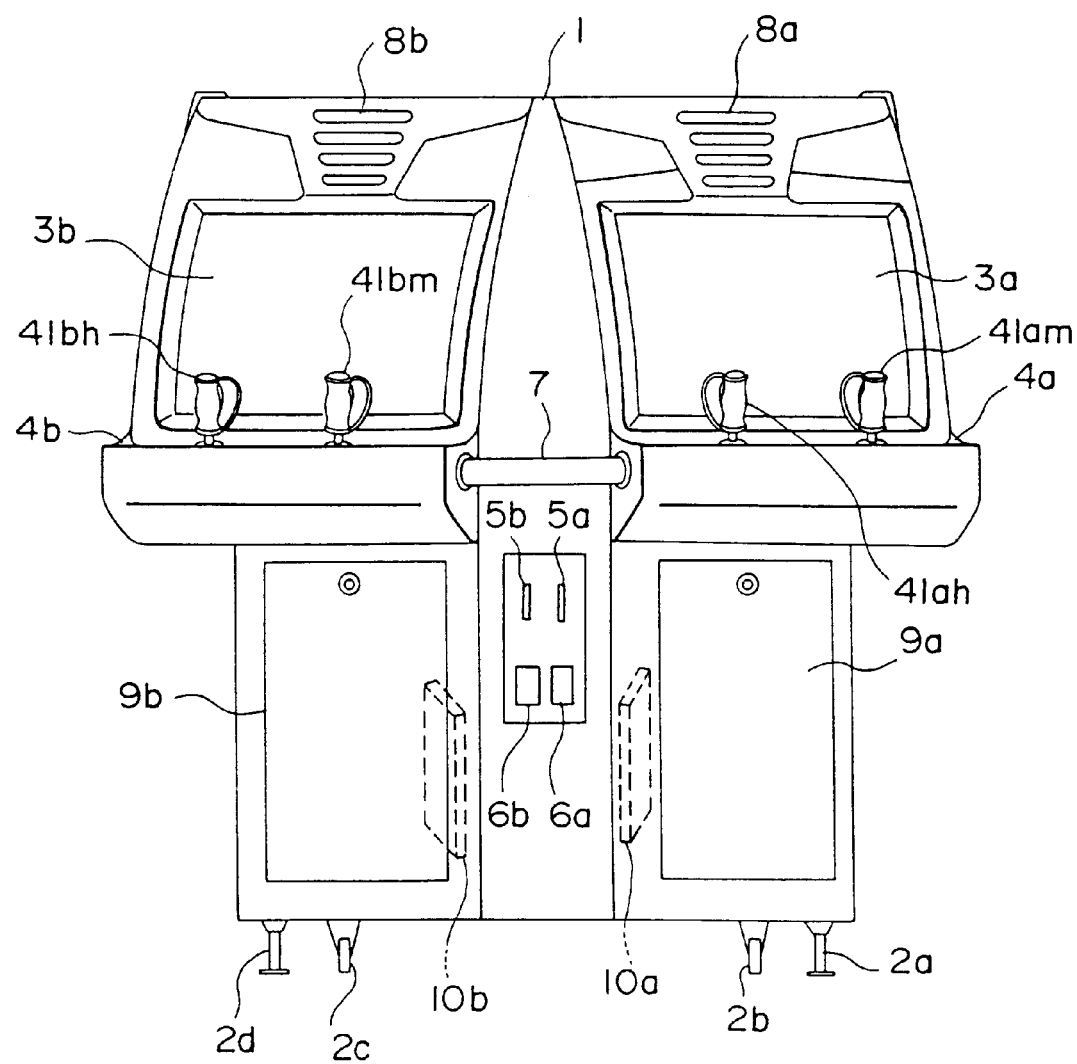
FIG. 1 is an entire perspective view of an embodiment of a game device to which a data processor according to the present invention is applied.

FIG. 1 shows an appearance of the game device. In this game device, a reference numeral 1 designates a game device main body. The game device main body 1 is box-shaped and casters 2a, 2b, 2c and 2d are provided on the lower part thereof. On the two faces of the game device main body 1, displays 3a and 3b respectively serving as display means are provided. Control panels 4a and 4b are provided on the front surfaces of the lower parts of these displays 3a and 3b. Coin insert ports 5a and 5b and coin take-out ports 6a and 6b are formed on a surface between the respective control panels 4a and 4b of the game device main body 1.

Between these control panels 4a and 4b, a round bar 7 for connecting both the panels together, for example, in terms of its strength, is provided. Speaker attaching holes 8a and 8b are provided above the respective displays 3a and 3b, and speakers (not shown) are provided in these holes 8a and 8b. Opening and closing plates 9a and 9b are provided in the lower parts of the respective control panels 4a and 4b so that inner mechanisms can be exposed.

Respective game processing boards 10a and 10b are provided in the inner part of the game device main body 1. The operating mechanisms of the respective displays 3a and 3b and the control panels 4a and 4b and the speakers, which are not shown, are connected to the game processing boards 10a and 10b. In the game device main body 1, a game can be enjoyed in a communication fighting form by using a single display 3a or 3b, or simultaneously using both the displays 3a and 3b.

Figure 2:
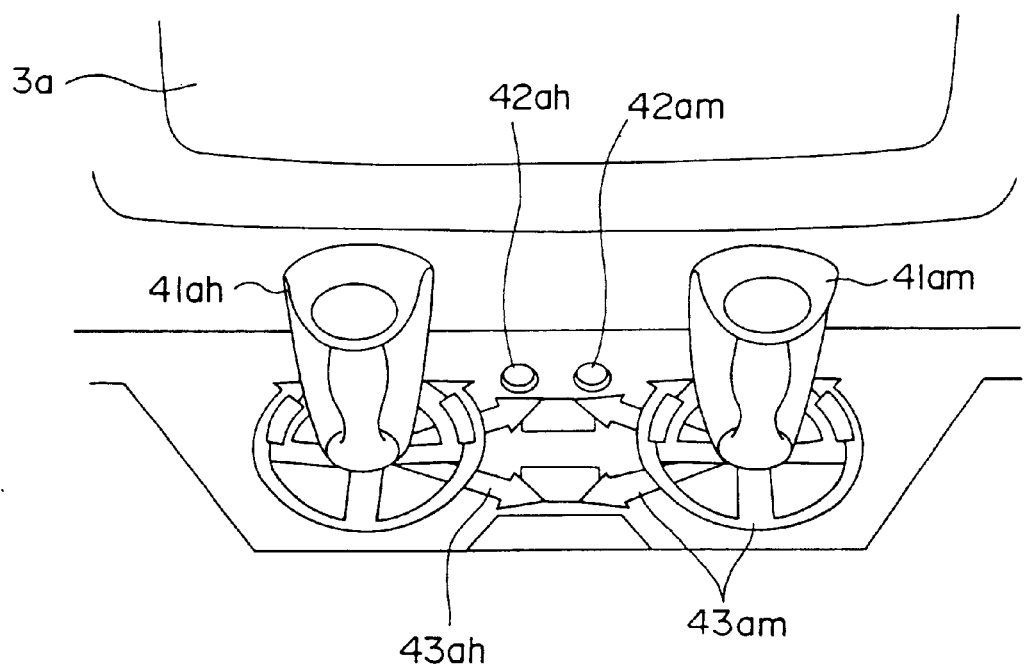
FIG. 2 is a perspective view specifically showing a control panel part of the above described embodiment.

FIG. 2 is a perspective view showing the control panel used in the above described game device main body. Since the control panels 4a and 4b have completely the same structure, one of them will be explained and the explanation of the other will be omitted.

The control panel 4a comprises two joy sticks 41am and 41ah and two push buttons 42am and 42ah. These joy sticks 41am and 41ah are arranged with a constant space therebetween on the control panels 4a and 4b. A player can control the movement of his or her character (boxer) by operating these joy sticks and the push buttons. The push buttons 42am and 42ah are arranged with a predetermined space therebetween in the front parts of the respective joy sticks 41am and 41ah. On the joy sticks 41am and 41h, guidances 43amand 43ah, are displayed, including a guidance for giving punches to an opponent fighter, a guidance for preventing attacks of the opponent fighter, or a guidance for advancing or retracting a character. The guidances include kinds of punches, for example, straight, upper, hook or the like, the movements of a fighter such as advancement, retraction, provocation, etc. and other necessary things in carrying out a game.

Figure 3:
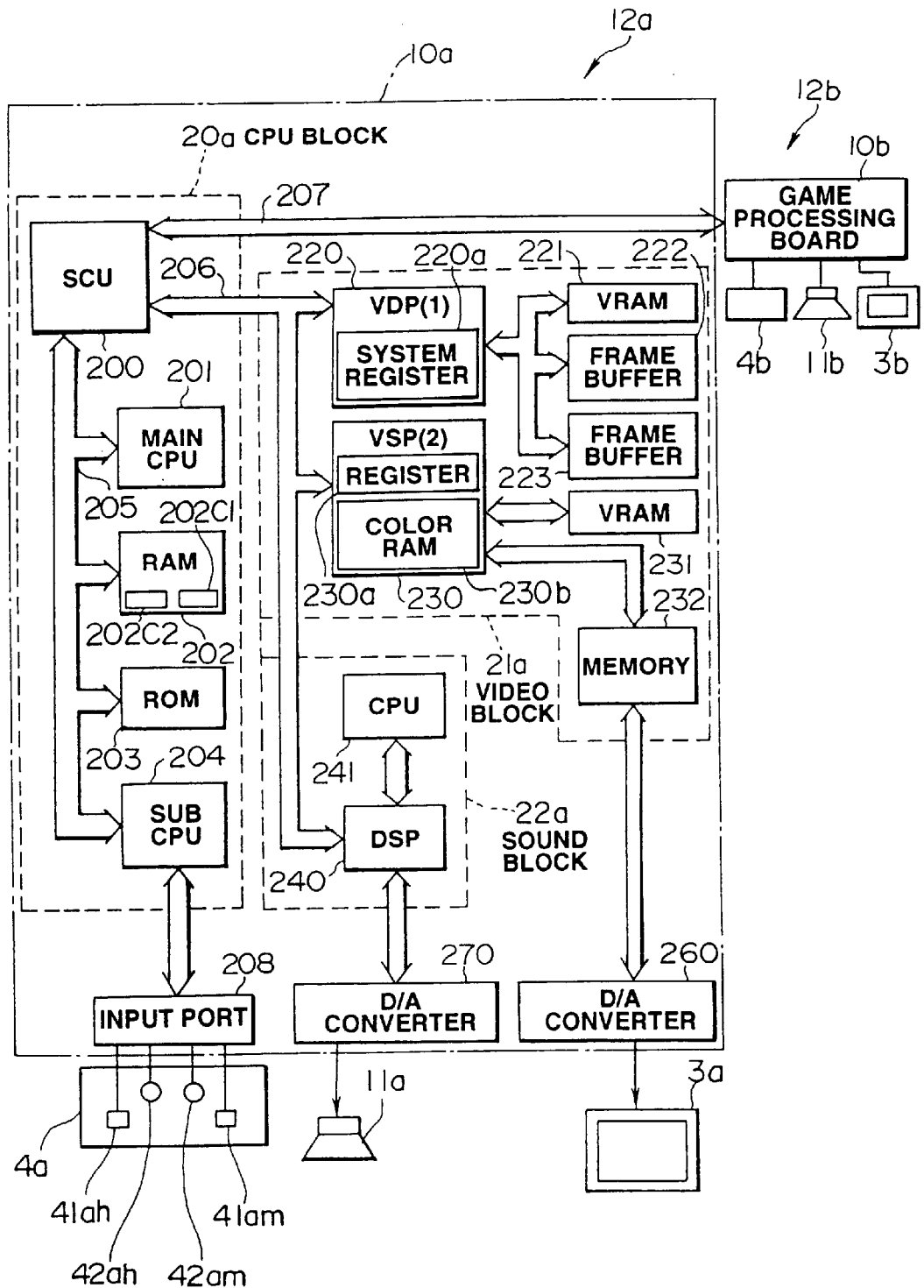
FIG. 3 is a block diagram showing a processing system of the above mentioned embodiment.
Figure 4:
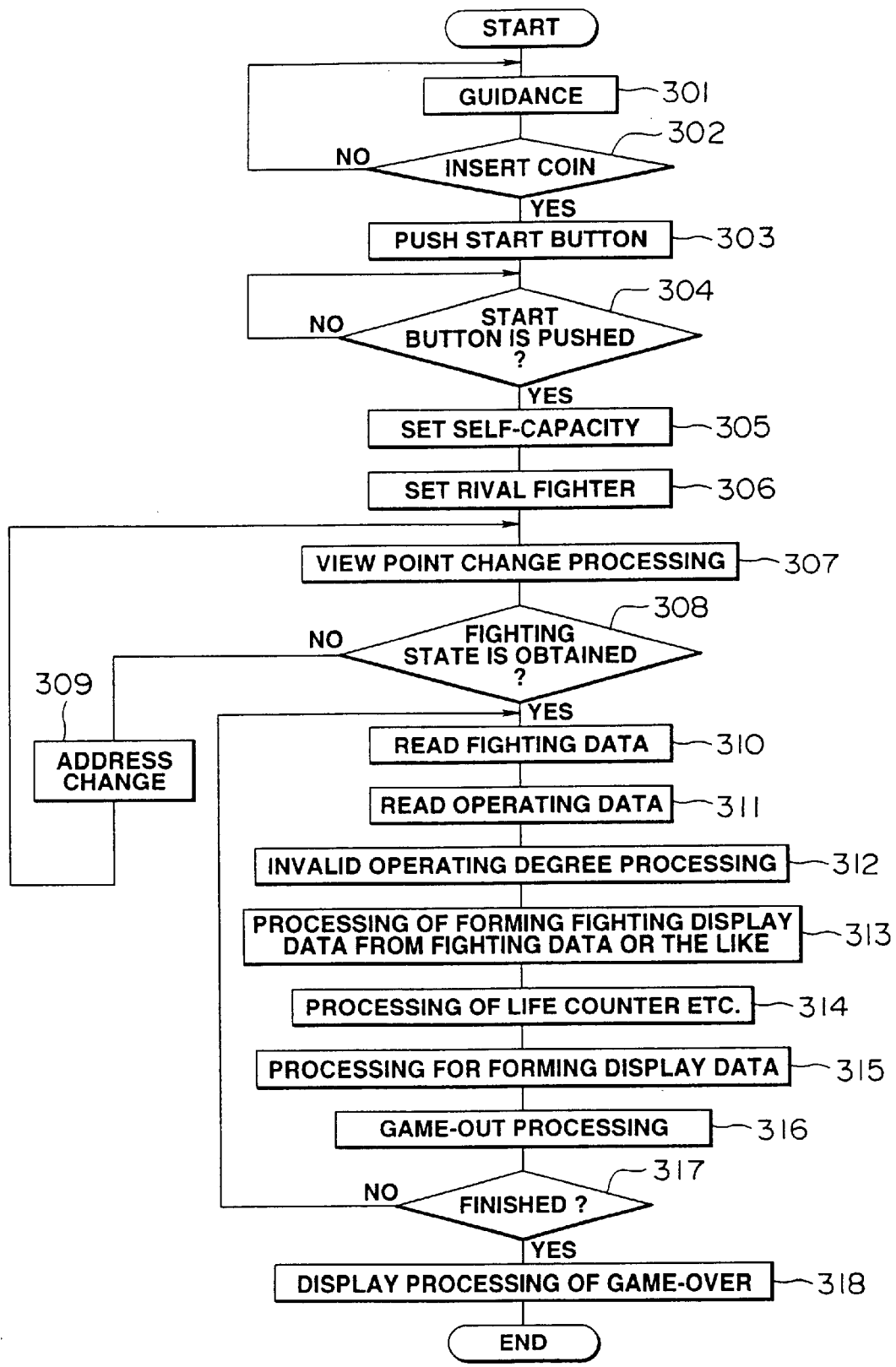
FIG. 4 is a flowchart showing all processing steps of the above described embodiment.

FIG. 3 is a block diagram showing a game device to which a data processor of the above mentioned embodiment is applied. This game device is provided with game processing boards 10a and 10b and speakers 11a and 11b as well as the above stated displays 3a and 3b and control panels 4a and 4b. This game device functions, when it is individually used, as a processing system 12a comprising the display 3a, the control panel 4a, the game processing board 10a and the speaker 11a.

Similarly, the other processing system 12b comprising the display 3b, the control panel 4b, the game processing board 10b and the speaker 11b can be also used. Both the processing systems 12a and 12b can be individually used simultaneously. In this case, the opponent fighter to the fighter of a player side is a boxer set by the game device.

On the other hand, the processing systems 12a and 12b are linked together in this game device so that a game can be enjoyed in a communication fighting form. In this case, the opponent fighter to the fighter of a player side is a fighter operated by each player operating each control panel 4a or 4b.

Since the processing systems 12a and 12b have the completely same structures, the processing system 12a will be only described and the explanation of the other processing system 12b will be omitted.

The processing system 12a comprises a CPU block 20a for controlling a whole device, a video block 21a for controlling the display of a game image plane and a sound block 22a for producing a effective sound or the like. The respective blocks are explained by affixing an alphabet "a" to reference numerals, however, respective elements forming the blocks are explained without affixing an alphabet "a" after the reference numerals.

The CPU block 20a comprises a SCU (System Control Unit) 200, a main CPU 201, a RAM 202, a ROM 203, a sub CPU 204, and CPU bus 205 or the like.

The main CPU 201 controls the whole device. This main CPU 201 is provided with a computing function similar to that of a DSP (Digital Signal Processor) therein so that an application software can be executed at high speed.

The RAM 202 is used as a work area of the main CPU 201. Further, the RAM 202 is provided with storing areas 202C1 and 202C2. These storing areas 202C1 and 202C2 are used for storing values obtained by gradually decreasing the whole surplus power of respective characters, for example, in the case of a boxing game in which two characters fight with each other.

An initial program for an initializing processing and contents (program) of a whole game are written in the ROM 203. The SCU 200 controls buses 205, 206 and 207 so that the input and output of data are smoothly carried out between the main CPU 201, a VDP (Video Display processor) 220, VDPs 220 and 230, a DSP 240, a CPU 241, and the like.

Further, the SCU 200 is provided with a DMA controller therein so that character data (polygon data) during a game can be transferred to a VRAM in the video block 21a. Thus, an application software of a game or the like can be executed at high speed. The sub CPU 204 is referred to as a SMPC (System Manager & Peripheral Control), collects through an input port 208 operating data from the joy sticks 41am and 41ah, and the push buttons 42am and 42ah of the control panel 4a in accordance with a request from the main CPU 201 and is provided with a function for carrying out a decision processing of the contents of operation such as kinds of punches or the like. The main CPU 201 carries out an image control such as the rotational transformation or the perspective transformation of, for example, a character on a game image plane, based on the operating data received from the sub CPU 204.

The video block 21a is provided with a first VDP (Video Display Processor) 220 for displaying a polygon image plane overwritten on a character and a background image composed of polygon data and a second VDP 230 for carrying out the display of a scroll background image plane, the image synthesis of polygon image data and scroll image data based on a priority (display priority), a clipping or the like.

The first VDP 220 includes a system register 220a therein and is connected to a VRAM (DRAM) 221 and two face frame buffers 222 and 223. Polygon picture display or drawing data displaying a character in a game is sent to the first VDP 220 through the SCU 200 from the main CPU 201 and written in the VRAM 221. The picture display or drawing data written in the VRAM 221 is drawn in the frame buffer 222 (or 223) for drawing a picture in the format of for example, 16 or 8 bits/pixel. The data of the frame buffer 222 (or 223) in which the picture is drawn is sent to the second VDP 230 during a display mode. As mentioned above, the two face buffers 222 and 223 are used for a frame buffer so that a double buffer structure, is formed, in which the picture drawing and display are switched for every frame. Further, information for controlling a picture drawing processing is set to the system register 220a of the first VDP 220 through the SCU from the main CPU 201. The first VDP 220 controls the picture drawing and display processing in accordance with an instruction set to the system register 220a.

In the meantime, the second VDP 230 includes a register 230a and a color RAM 230b therein and is connected to a VRAM 231. Further, the second VDP 230 is connected to the first VDP 220 and the SCU 200 through a bus 206 and connected to the display 3a through an encoder 260.

For the second VDP 230, scroll image data is defined in the VRAM 231 and the color RAM 230b through the SCU 200 from the main CPU 201. Information for controlling the display of an image is also similarly set to the register 230a of the second VDP 230. Data defined in the VRAM 231 is read based on the contents set to the register 230a by the second VDP 230 and becomes the image data of respective scroll image planes displaying a background relative to a character. The display priority (priority) of the image data of the respective scroll image planes and the image data of texture mapped polygon data which is supplied from the first DVP 220 is determined in accordance with the setting in the resister 230a and final display image data is synthesized.

When this display image data is in a form of pallet, the color data defined in the color RAM 230b is read based on the value by the second VDP 230 form, and display color data is generated. When the display image data is in the form of RGB, the display image data directly becomes display color data. The display color data is stored in a memory 232, and then, output to a D/A converter 260. The D/A converter 260 generates a video signal by applying a synchronizing signal or the like to the image data and outputs the video signal to the display 3a. Thus, a game image plane is displayed on the display 3a. A video means is constituted of the video block 21a.

The sound block 22a is provided with a DSP 240 for carrying out a sound synthesis in accordance with a PCM mode or an FM mode and a CPU 241 for carrying out the control or the like of the DSP 240. Sound data generated by the DSP 240 is converted into a sound signal by a D/A converter 270 and then, the sound signal is output to the speaker 11a.

The contents of a game processed in the game device of the present embodiment, like the above stated "Virtual Fighter (™) realize the fighting (boxing) of a plurality of fighters on a stage. An opponent fighter is explained as a boxer controlled by the device side.

Next, there will be explained a processing for synchronizing display control, which is executed by the main CPU, for an image plane (referred to as a polygon image plane, hereinafter) of characters (fighters) C1 and C2 represented by three-dimensional data composed of polygons, a rope or the like, and a scroll image plane of other background or the like such as a ring on which boxers stand, the life count values of the boxers and an audience. The ring among them is formed with a rotating scroll. All operations will be initially explained by using main processing flowcharts shown in FIGS. 4 and 5. Then, the detailed operations of, for example, a polygon forming means, a polygon number increasing means, a transforming or deforming means and an image processed surplus power display means or the like will be described using figures after FIG. 6.

The main CPU 201 displays, when there is no insertion of coins, for example, the digest of the contents of a game and a guidance image plane for coin insertion and outputs a sound together with the displays (step (S)301, step 302; NO in FIG. 5). When there is the insertion of coins (step 302; YES), the main CPU 201 displays a guidance image plane for urging, for example, the push button 42am to be pressed as a start button (S303, S304; NO). When the start button is pressed (S304; YES), a player sets his or her capacity (S305). In this connection, since the capacities of, for example, several characters are set to the processing system 12a and these characters are displayed on the display 3a, a desired character is suitably selected among them. Thus, the capacity of the character such as the power of a punch, the speed of a punch, the resistance to a damage, stamina, etc. is set. The structure of a character will be shown in FIG. 6.

Then, since the main CPU 201 displays a display for setting the characters of rival fighters on the display 3a, a player suitably selects a rival fighter among them (S306). Thus, the capacity of the character as the rival fighter is also set.

Figure 6A:
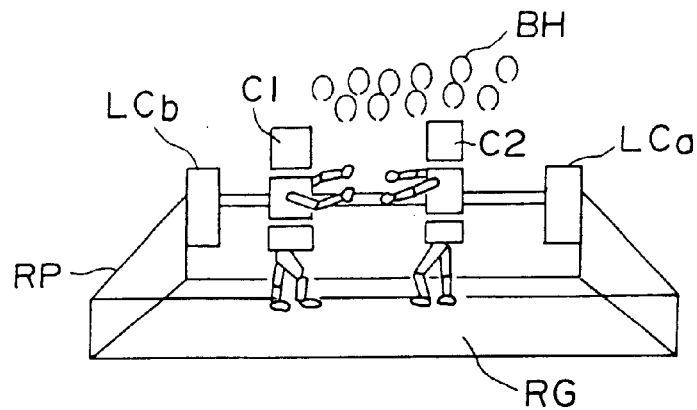
FIG. 6 shows views for explaining an operation displayed in a fighting state rotated from a state in which two fighters fighting with each other in the above mentioned embodiment face.

Herein, the main CPU 201 also carries out a viewpoint changing processing for display data in step 307 and, finally, a perspective processing for a part of the character C1 (for example, a head, a main part, an upper part of arm, etc.). Specifically, the main CPU 201 first reads display data from a predetermined address of the ROM 203, and converts it into viewpoint changed display data. Thus, on the display 3a, the facing characters (fighters) C1 and C2 are initially displayed in a formation seen just from a side, as illustrated in FIG. 6(a). In FIG. 6, C1 and C2 designate characters (fighters), RP a rope, RG a ring, LCa and LCb life counters, and BH other background. Further, in the present embodiment, the fighters C1 and C2 and the rope RP are displayed by polygon data, the ring RG by rotating scroll data and the background BH such as an audience by scroll data.

Then, the main CPU 201 decides whether the characters C1 and C2 are brought to a state in which they can fight with each other or not (S308). Herein, a state in which the characters fight with each other means a state in which a personal character (fighter) C1 is displayed in the front side of an image plane on the display 3a, a part of the fighter C1, for example, the head, the waist, the upper part of arm or the like is subjected to a transparent processing and an opponent character (fighter) C2 faces the front face of the image plane.

At this time, since the characters C1 and C2 have not yet fought with each other (step 308; NO), the address of the ROM 203 is changed (step 309), and further, a display processing of viewpoint change is carried out (step 307). These processings are repeated, so that a viewpoint rotates from a state in which the fighters C1 and C2 are seen just from a side as shown in FIG. 6(a) to a state in which the fighter C1 is displayed in the front part as shown in FIG. 6(c). Displaying the middle part of the display state rotated as mentioned above, a state, is seen, in which the facing fighters C1 and C2 are slantingly displayed, as illustrated in, for example, FIG. 6(b).

Figure 5:
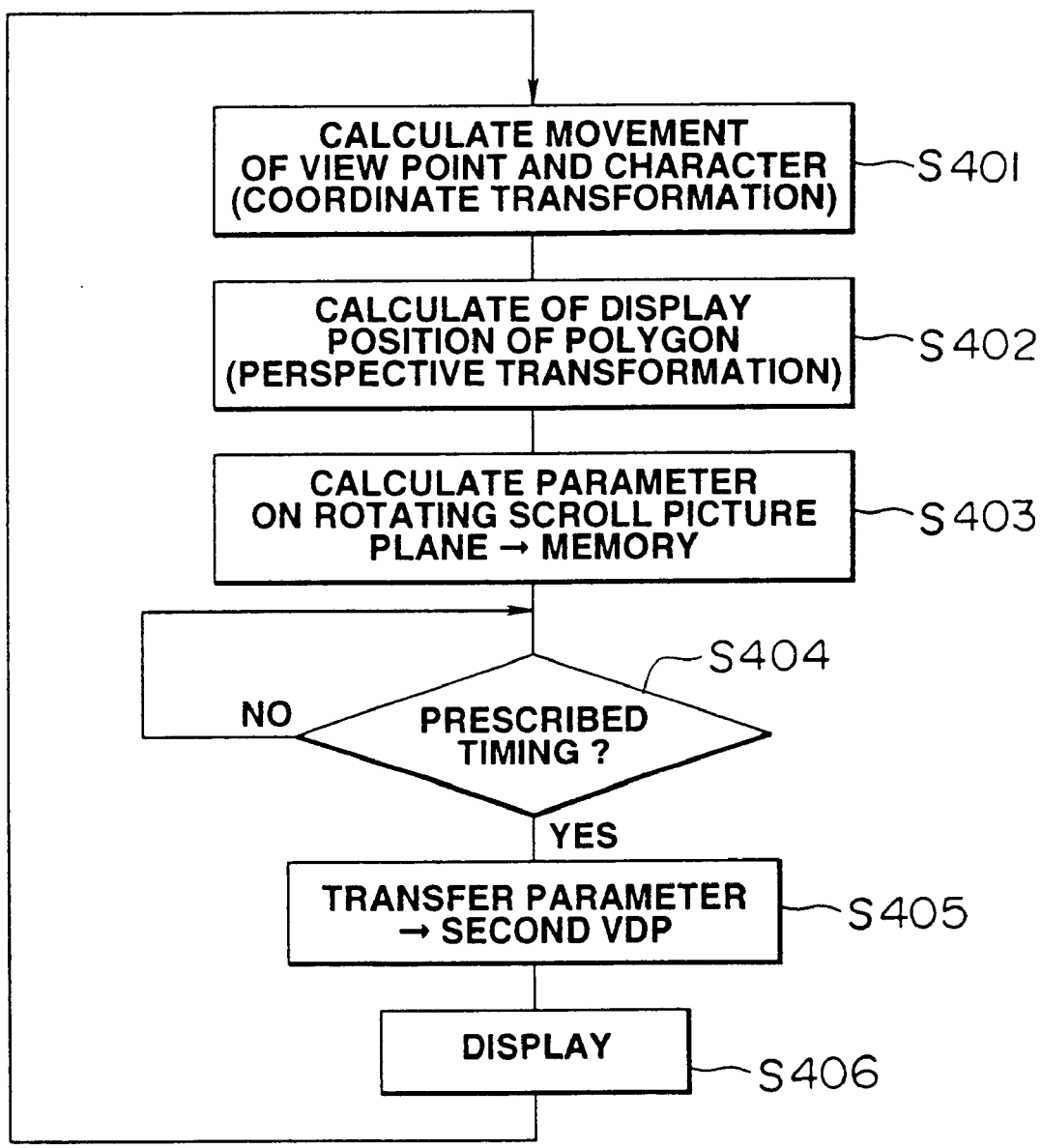
FIG. 5 is a flowchart showing the specific operation of a display processing of the above described embodiment.
Figure 6B:
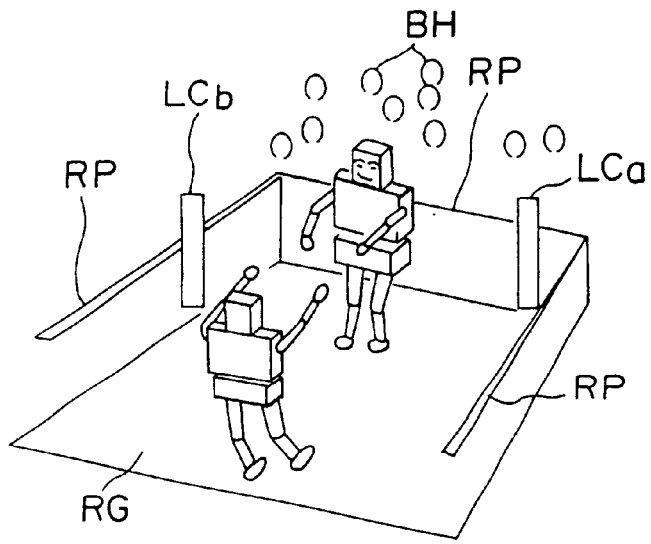
Figure 6C:
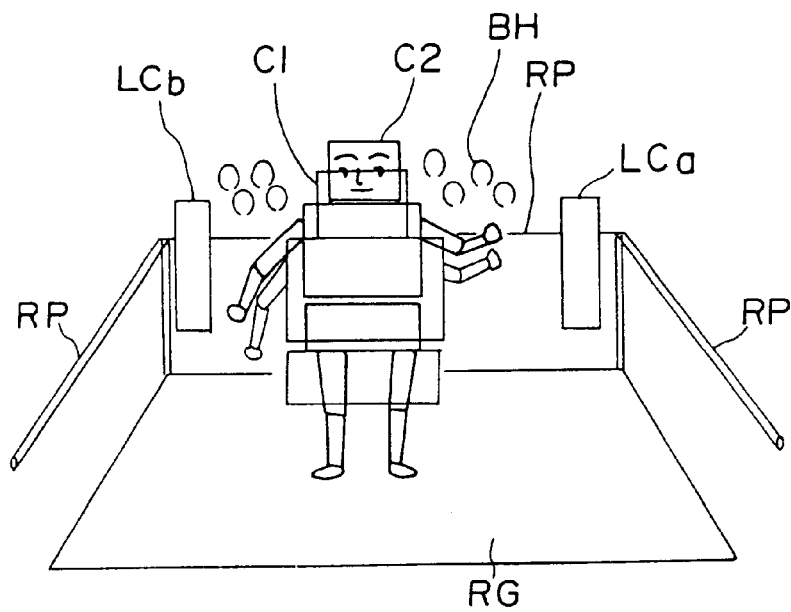

An image processing accompanied by the change of a viewpoint for displaying the characters on the image plane, which includes the movement of FIG. 6(a) to FIG. 6(c), is carried out in accordance with, for example, a flowchart shown in FIG. 5. That is, the main CPU 201, in step S401 of FIG. 5, first calculates the moving coordinate of the viewpoint based on data read from the ROM 203 and the moving coordinates of display members composed of polygons such as the characters C1 and C2 and the rope RP, etc. represented by polygon data with texture. The calculation of the moving coordinates is carried out by using affine transformation capable of effecting a parallel displacement, a rotational transformation and extension (reduction) relative to each axis by one operation. The affine transformation has been conventionally well known.

Then, in step S402, position data (screen coordinate) in a screen (image plane) on which three-dimensional polygon data subjected to a coordinate transformation by a perspective transformation (fighter C2, fighter C1 a part of which undergoes a perspective processing, rope RP) is displayed is calculated and sent to the first VDP 220.

Then, the main CPU 201 proceeds to step S403 and calculates parameters required for the rotation or collapse of the rotating scroll image plane. Herein, the "rotation" of the rotating scroll image plane means a rotation in a scroll coordinate system and the rotation of an entire coordinate system about any one of three axes. The "collapse" means the rotation of a screen image plane itself, and specifically means that the ring RG part in a remote part viewed from the side of a player is displayed in reduction, the ring part RG in the side of a player is displayed in extension or both processings are simultaneously carried out.

Next, the main CPU 201 stands-by while deciding whether it is a predetermined timing for drawing the above described polygon data or not in step S404. Then, for example, at the time of a predetermined timing, the parameters required for the processings of rotation and collapse of the rotating scroll image plane which have been stored in a memory, that is, rotation matrix parameters, the amount of movement (the amount of movement of X and Y of the scroll image plane owing to the movement of a viewpoint) and magnification are transferred to the second VDP 230 in step S405. Then, in step S 206, the main CPU 201 executes the commands of display or picture drawing.

The main CPU 201 periodically repeats the above stated processings of step S401 to S406. The polygon data calculated in the main CPU 201 is written in the VRAM 121 connected to the first VDP 220 and a display and a picture drawing are repeated by the two picture drawing frame buffer 222 (or 223) and display frame buffer 223 (or 222) of a double buffer structure. In other words, while the picture of texture mapped polygon data is drawn in the picture drawing frame buffer 222 (or 223), the polygon data of the display frame buffer 223 (or 222) is sent to the second VDP 230 and displayed. In the second VDP 230, the three-axes rotation of the rotating scroll image plane and the rotation of the screen image plane (collapse) are calculated by using the parameters and data transferred from the main CPU 201.

The display image plane of the rotating scroll image plane is formed by carrying out the rotational transformation (including parallel displacement) of a viewpoint and a screen image plane (TV screen) based on a center point and collecting points at which a line of sight passing the transformed screen image plane from the transformed viewpoint intersects a scroll map.

When the flowchart of FIG. 5 is executed in such a manner, the image planes are displayed on the display 3a in accordance with the order of FIG. 6(a), FIG. 6(b) and FIG. 6(c). That is, the viewpoint sequentially moves so that the fighter C1 is displayed in the front side and the fighter C2 is displayed in the rear side from a state in which the facing fighters C1 and C2 are seen just from a side as shown in FIG. 6(a). Processings accompanied by the movement of the viewpoint in other scene are also performed in accordance with the flowchart of FIG. 5. During movement of the viewpoint, as shown in FIG. 6(b), the fighters C1 and C2 are displayed under a condition in which they are slantingly seen. Finally, as shown in FIG. 6(c), the fighter C1 of a player side is displayed in the front side of the image plane and in a perspectively processed state on the display 3a, and the rival fighter C2 is displayed in a state where it faces the front face of the image plane.

As described above, when the personal fighter C1 is displayed in a perspectively processed state in the front side of the image plane and the rival fighter C2 is displayed under a state he faces the front face of the image plane, they fight with each other (step S308; YES), and then, the process proceeds to the flowchart showing a fighting state.

Then, when the process proceeds to the flowchart of a fighting state (step 310) and that following it, the main CPU 201 first reads the data of a fighting state from the ROM 203. Further, the main CPU 201 fetches operating data from the sub CPU 204 in step 311, and carries out a processing of data of invalid operating degree in step 312. Herein, the invalid operating degree is included in a suppressing means described in the claims.

The invalid operating degree in the step 312 is generated, for example, when the operating data is not input from the joy sticks 41am and 41ah or the like in accordance with the rule of a boxing. Factors for increasing the invalid operating degree reside in that, for example, the joy sticks 41am and 41ah are operated a predetermined number of times or more per unit time, or the joy sticks 41am and 41ah are continuously input to a protective command position for a predetermined time. Further, factors of decreasing the invalid operating degree reside in that, for example, a protective command is input from the joy sticks 41am and 41ah or the moving command of a character is input.

Still further, when the invalid operating degree is stored in, for example, the RAM 202 or the like, and an image processing for forming next fighting display data is carried out, the degree of the image processing is suppressed depending on the invalid operating degree. For example, as described below, the invalid operating degree may influence the a display of the amount of surplus power by an image processed surplus power display means, or an image processing for cancelling or decreasing a damage to be applied to an opponent fighter may be carried out even when a punch is given to him.

Then, the main CPU 201 carries out a processing for forming fighting display data based on the fetched fighting data and operating data as mentioned above (step 313).

The fighting display data formed in the step 313 is display data for protectively moving the fighter C1 by protectively operating the joy sticks 41am and 41ah or the like of the control panel 4a, for example, when the rival fighter C2 supplies an uppercut, or for giving a punch to the rival fighter C2 by extensively operating the joy sticks 41am and 41ah or the like of the control panel 4a. Thus, the rival fighter C2 changes, when the punch strikes him, the deformed direction of the face (head) of the fighter C2 depending on the kind of the punch (straight, jab, hook, uppercut), and the amount of deformation or transformation of the face (head) of the fighter C2 depending on the strength of the punch.

Further, when the punch supplied from the rival fighter C2 strikes the fighter C1, a movement processing of the fighter C1 is also carried out. Still further, in the step 313, the back side of the fighter C1 is also displayed and a part of the fighter C1 (for example, the head, the breast, the waist, the upper part of arm, etc.) is perspectively processed and displayed.

Then, the main CPU 201 performs processings related to a remaining surplus power display means in step 314. That is, in the step 314, the processings for displaying the surplus power of the fighters C1 and C2 are carried out. In this case, firstly, the invalid operating degree obtained in the step 312 influences a processing for decreasing the surplus power (life count value). Secondly, the damage of the fighters (the opponent side C2 and the private side (player side) C1) is computed and the invalid operating degree influences a processing for decreasing it in the surplus power.

In addition, when the damage exceeds a predetermined value, the main CPU 201 performs a processing for knocking the fighter down. The processing is carried out in such a way, so that a whole surplus power display means for displaying the whole surplus powers of the fighters C1 and C2 and a remaining surplus power display means for displaying remaining surplus powers relative to the whole surplus powers of the fighters C1 and C2 are realized. Further, a storing means for storing a plurality of surplus powers is provided in an area of the RAM 202 and all surplus powers stored in the storing means are read as required, so that all the surplus powers can be sequentially reduced. Then, these image processings are carried out, so that damages applied to the respective fighters C1 and C2 can be displayed on the display 3a as life counters and the damages are accumulated for every round.

The fighting display data obtained in the step 313 and the data concerning the life counters obtained in the step 314 are delivered to a display data forming processing (step 315). In the step 315, the main CPU 201 carries out, for example, the flowchart shown in FIG. 5 by using the fighting display data formed in the step 313 and the data related to the life counter formed in the step 314. Thus, the fighting state of the fighters C1 and C2 is displayed on the display 3a.

Then, the main CPU 201 carries out a processing of game out in step 316. In this case, the damages of the fighters C1 and C2 are computed and when the damage exceeds a predetermined value, as in the case where one fighter is knocked down three times, a command of down or the like is carried out.

The main CPU 201 decides whether a game in which there is a down or the like is finished or not in step 317. When the game is not finished, the main CPU 201 shifts again the processing to the step 310.

The above mentioned processings of the steps 310 to 317 are repeated, so that the fighters C1 and C2 composed of polygons are displayed in a superimposed state on the ring RG constituted of the scroll image plane. The elongated rope RP composed of polygon data is overwritten along the edge of the upper side in the end part of the ring RG.

Then, when the fighters C1 and C2 or the viewpoint move, as the game progress, the movement of the fighters C1 and C2, the scroll image plane and the rope PR composed of polygon data which is overwritten on the end part of the image plane are synchronously displayed, and therefore, both movements can be recognized as an accurately coinciding movement set to an input from the joy sticks 41am and 41h or the like. Thus, an entire scene accompanied by the movement of the fighters C1 and C2 or the change of a viewpoint becomes extremely natural, so that a feeling like being actually present there can be produced.

Additionally, the main CPU 201 decides a detection result in the step 317 and carries out a display processing of the end of a game in step 318, at the time of an end.

In the next place, the detailed operations of predetermined steps in the above described flowchart will be described, referring to the drawings after FIG. 7.

On Processing for Obtaining Invalid Operating Degree

Figure 7:
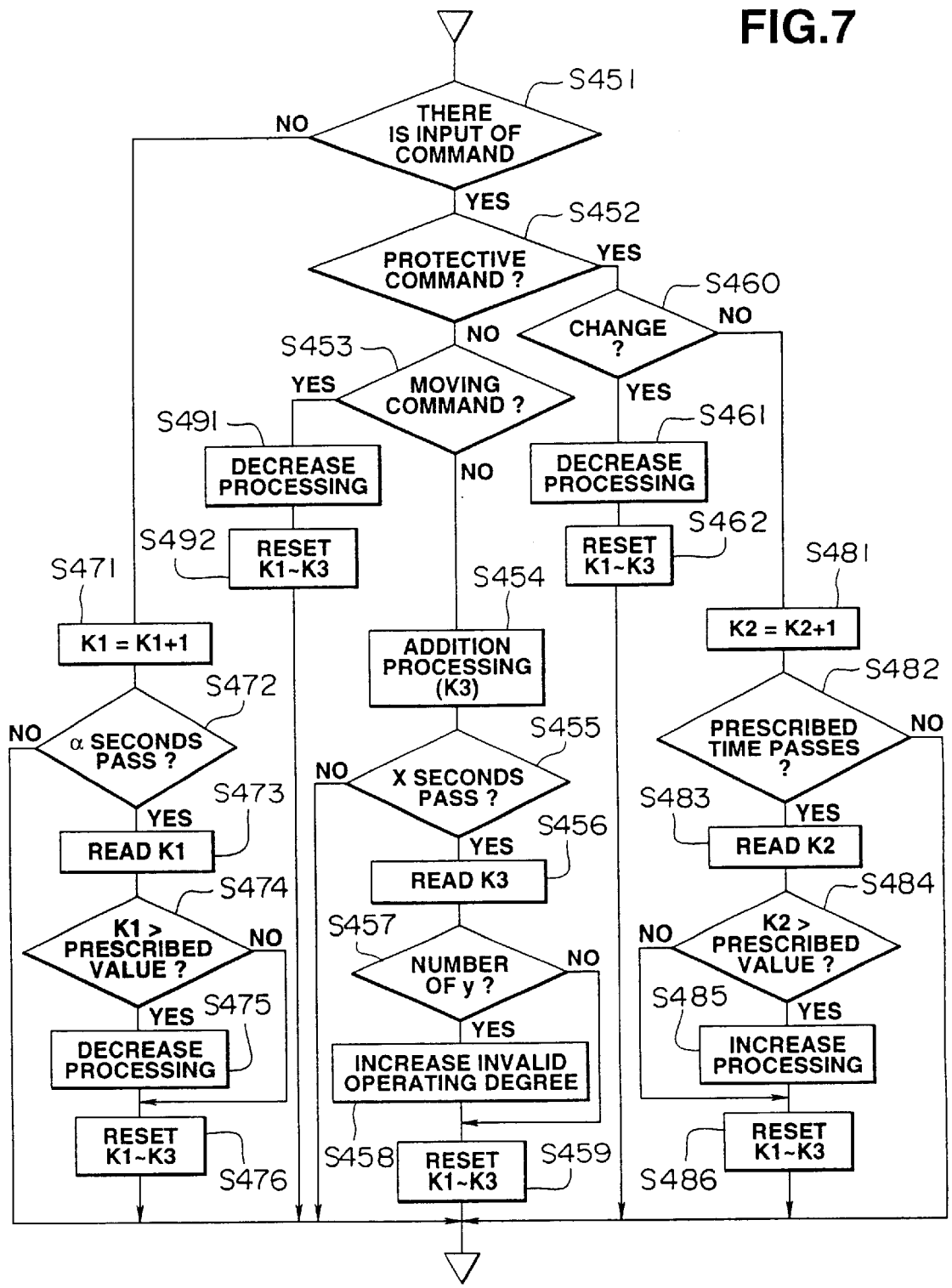
FIG. 7 is a flowchart for explaining the operation of an invalid operation degree processing means of the above described embodiment.
Figure 8:
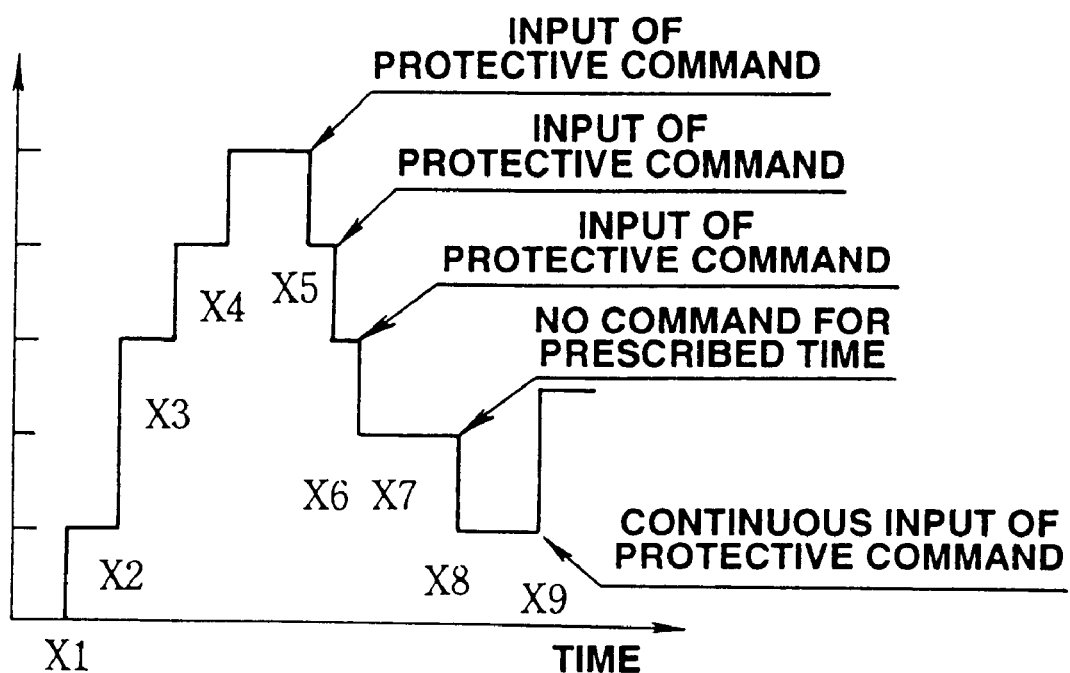
FIG. 8 is a graph illustrating the states of invalid operation degrees in the above mentioned embodiment.

With reference to FIGS. 7 and 8, a processing for obtaining an invalid operating degree will be described. FIG. 7 is a flowchart for obtaining the invalid operating degree. FIG. 8 shows a graph of an invalid operating degree, an x-axis indicates time and a y-axis indicates an invalid operating degree.

This invalid operating degree represents a degree generated when there is no operating input of the joy sticks 41am and 41ah or the like. The invalid operating degree is obtained when the number of inputs of continuous punch commands per unit time is a predetermined value or more. Further, when the pattern of input of a command is constant, the invalid operating degree is increased.

When there is no operating input from the joy sticks 41am and 41ah or the like in accordance with the rule of a boxing, a processing will be first described. This processing is carried out by shifting the process to the processing of step 312 in FIG. 4. That is, the main CPU 201 decides whether operating data is obtained from the sub CPU 204 or not in step 451. In this case, when the operating data is obtained (step 451;YES), the main-CPU 201 decides whether this operating data is a protective command or not in step 452. Herein, when it is decided that the operating data is not the protective command (step 452;NO), the main CPU 201 decides whether this operating data is the moving command of the fighter C1 or not in step 453. The reason why such a decision is made is that the joy sticks 41am and 41ah are continuously operated so as to decide whether the punch command is continuously input or not.

When the operating data is not the protective command of the fighter C1 (step 453;NO), it is decided that the data does not designate an effective punch meeting the rule of a boxing and designates a simply swung punch. The main CPU 201 adds the number of times of operating data one by one to a register K3 in step 454. This register K3 may be provided in, for example, a predetermined area of the RAM 202. Further, the register K3 accumulates punch commands owing to the continuous operation of the control panels 4a and 4b.

Then, the main CPU 201 decides whether a constant time x (seconds) passes or not (step 455). This decision is made in order to decide what number of punch commands are input per unit time (x (second)). When the constant time x (seconds) does not pass (step 455;NO), the main CPU 201 can pass this processing routine.

On the other hand, when the constant time x(seconds) passes (step 455;YES), the main CPU 201 reads the data of the register K3 in step 456. The read data designates the number of punches y per unit time (x(seconds)).

Further, the CPU 201 decides, when the data of the register K3 represents 1y or more (step 457; NO), that an operation according to the rule of a boxing and, stores a one added invalid operating degree in an invalid operating degree storing area provided in the predetermined area of the RAM 202 (step 312). The value of the invalid operating degree stored in the storing area designates a value obtained by adding one to the invalid operating degree (time x1), as shown in FIG. 8. Then, the main CPU 201 resets registers K1 to 3 in step 459 so that the previous contents do not influence a next processing and can pass this processing.

When the CPU 201 similarly carried out the processings of the steps 451 to 455 and performs the processings of the steps 456 to 457 to obtain the number of 2y, a storing processing is performed so that two is further accumulated to the previous value in the invalid operating degree storing area (step 458). The value of the storing area represents a value obtained by further adding two to the invalid operating degree (time x2) as shown in FIG. 8. Then, the main CPU 201 resets the register K 3 for a next processing in the step 459 and can pass the processing.

Further, similarly when the CPU performs the processings of the steps 451 to 455 and carries out the processings of the steps 456 to 457 at time x3 so that the number of 1y is obtained, a value obtained by further adding two to the previous value is stored in the invalid operating degree storing area (step 458). The value of this storing area indicates the invalid operating degree further added by one (time x3), as shown in FIG. 8. Then, the main CPU 201 resets the register K3 in step 459 and can pass the processing.

Similarly, when the main CPU carries out the processings of the steps 451 to 455 and performs the processings of the steps 456 to 457 at time x4 so that the number of 1y is obtained, a value obtained by further adding two to the previous value is stored in the invalid operating degree storing area (step 458). The value of the storing area indicates the invalid operating degree further added by one (time x4), as shown in FIG. 8. Then, the main CPU 201 resets the register K3 for a next processing in step 459 and can pass the processing.

As described above, when the joy sticks 41am and 14ahare not operated in accordance with the rule of the boxing, the invalid operating degree becomes higher values.

Now, a case in which the invalid operating degree is lowered will be described. When a command is input (step 451;YES), the main CPU 201 decides whether it is a protective command or not in step 452. When the command is the protective command (step 452;YES), the main CPU 201 decides whether the protective command is changed to other command or the like (or neutral position) in a short time or not in step 460. This processing is carried out in order to decide whether it is an operation according to the rule of the boxing or not.

When the protective command is changed to other command or the like (step 460;YES), the main CPU 201 subtracts one from the invalid operating degree of the invalid operating degree storing area step (461). The value of the storing areas is the invalid operating degree decreased by one (time x5), as illustrated in FIG. 8. After passing the processing, the main CPU 201 resets the registers K1 to K3 for a next processing in step 462.

Then, the operation of a case in which a command is not input will be described. When the command is not input (step 451; NO), the main CPU 201 carries out a processing for the increment of a value of, for example, the register K1 in step 471 (K1=K1+1). This processing is an addition executed in order to detect no input of a command for a predetermined time. Further, for the register K1, for example, one provided in the predetermined area of the RAM 202 may be used.

Then, the main CPU 301 decides whether a constant time a (seconds) passes or not (step 472). The decision of time is made in order to detect no input of a command continuously for a predetermined period. When a constant time a (seconds) does not pass (step 472;NO), the main CPU 201 passes this processing.

On the contrary, when a constant time a (seconds) passes (step 472;YES), the main CPU 201 reads the value of the register K1 in the step 473. The value of the register K1 indicates no input of command for a predetermined time. Accordingly, if this value is larger than a predetermined value (step 474;YES), it can be deemed that a command is not input for a constant time, so that the main CPU 201 subtracts one from the invalid operating degree in the invalid operating degree storing area in step 475. Thus, the value of the storing area is a value obtained by subtracting one from the invalid operating degree (time x7) as shown in FIG. 8. Then, the main CPU 201 resets the respective registers K1 to K3 for a next processing When the value of the register K1 is smaller than the predetermined value (step 474;NO), the main CPU 201 resets the respective registers K1 to K3 in step 476 and passes this processing.

Further, the operation of a case in which the protective command is continuously input will be described. In this case, the main CPU 201 passes the steps 451, 452 and 460 and carries out the increment of, for example, the register K2 in step 481 (K2=K2+k1). This register K2 is assigned to a predetermined storing area of, for example, the RAM 202. The register K2 serves to measure the continuous input of the protective command.

Then, the main CPU 201 decides whether a constant time passes or not (step 482). The decision of time is carried out in order to decide whether the protective command is continuously input for a constant time or not. When a constant time does not pass (step 482;NO), the main CPU 201 passes this processing.

On the other hand, when the constant time passes (step 482;YES), the main CPU 201 reads the value of the register K2 in step 483. In this case, when the value of the register K2 is larger than a predetermined value (step 484;YES), the main CPU 201 decides that the protective command is continuously input. Then, the CPU 201 adds one to the invalid operating degree of the invalid operating degree storing area (step 485). The value of the storing area is a value obtained by adding one to the invalid operating degree (time x9), as seen in FIG. 8. After this processing is finished, the registers K1 to K3 are finished for post-processings in step 486. The continuous input of the protective command in such a way causes the invalid operating degree to be increased.

The operation of other cases in which the invalid operating degree is lowered will be described. This is an operation when the moving command of the fighter C1 is input. That is, when the moving command of the fighter C1 is input (step 453;YES), the main CPU 201 subtracts one from the invalid operating degree of the invalid operating degree storing area in step 441. Thereafter, the main CPU 201 resets the registers K1 to K3 for post-processings in step 442.

As described above, in the respective steps 451 to 492, whether the operation according to the rule of the boxing is input from the joy sticks 41am and 41ah or the like or not is decided. The invalid operating degree stored in the invalid operating degree storing area is used to suppress the degree of an image processing in post-processings. For example, it can influence a processing for decreasing the value of a life counter, or it can be used for decreasing the effectiveness of a punch or the like, or denying the effectiveness, even when the punch or the like strikes the opponent fighter C2.

In such a manner, a player can be urged to assuredly operate the joy stick 41am and 41ah, and the actual movement in, for example, a boxing, is given to the player so that the player can operate the joy sticks 41am and 41ah or the like similarly to the movement.

Operation of Polygon Forming Means and Polygon Increasing Means

Figure 9:
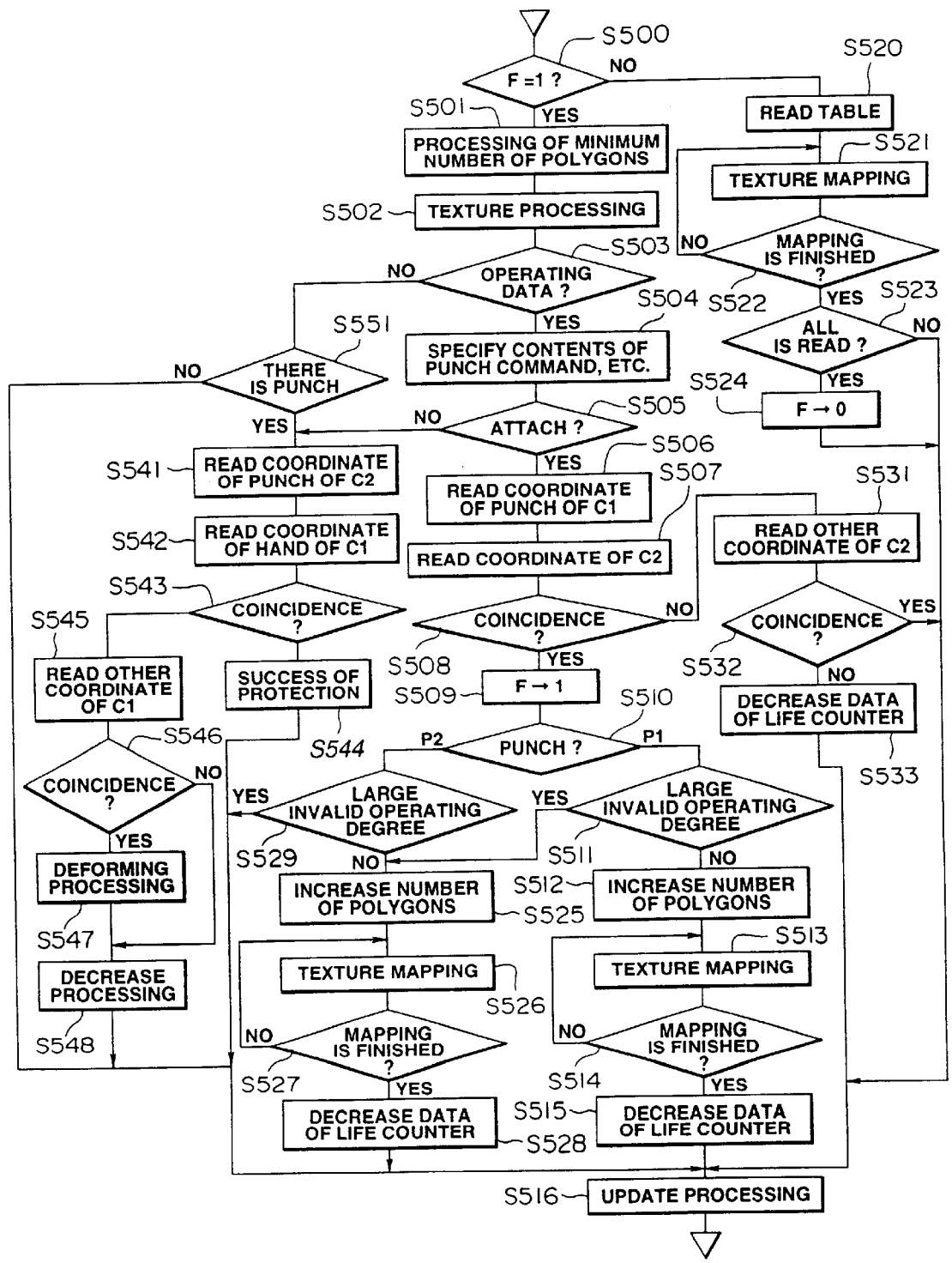
FIG. 9 is a flowchart for explaining the operations of a polygon forming means and a polygon number increasing means of the above described embodiment.
Figure 10A:
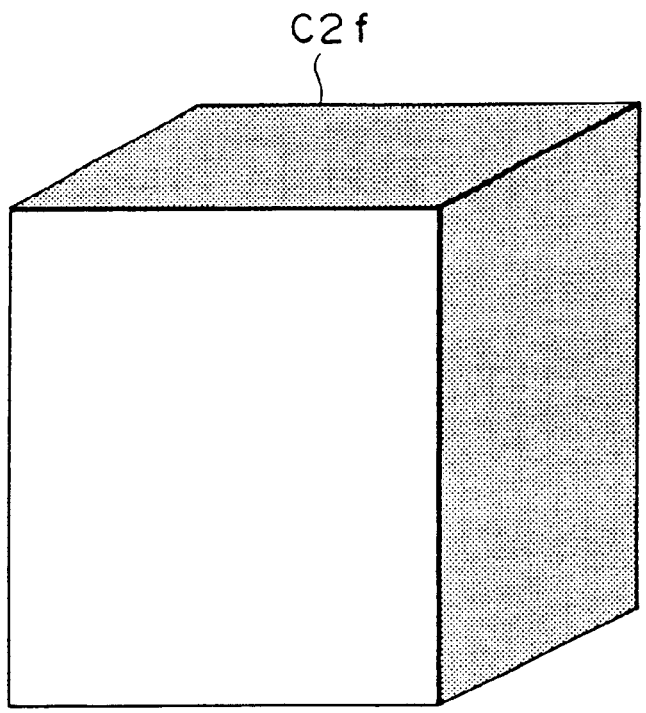
FIG. 10 is an explanatory view of the operation of the polygon forming means of the above described embodiment.

Next, referring to FIGS. 9 to 11, there will be described an image processing for forming the face (the head) of the fighter C2 with the minimum number of polygons in an ordinary display state, increasing the number of polygons for forming the face (the head) and then deforming the face (the head) based on the increased number of polygons when the face (the head) is deformed and the deformed face is displayed.

Initially, the main CPU 201 decides whether a flag FLG is 0 or not in step 500. This decision is made in order to decide whether a reading processing of table data for a deforming processing is carried out or not. When the table data is read, a special processing flowchart is performed. When the table data is not read, an ordinary deciding processing is carried out.

Herein, since the flag FLG is first set to 0, the main CPU 201 carries out an image processing for forming the face (the head) of the fighter C2 with the minimum number of polygons in step 501. In this image processing, for example, each face of the face (the head) of the fighter C2 is composed of a polygon of a square. Thus, for example, as shown, in FIG. 10(a), the face (the head) C2 of the fighter C2 is formed in the shape of a cube (hexahedron) composed of six polygons. Specifically stated, one polygon is arranged by specifying four vertexes in a three-dimensional coordinate and each face has commonly the two vertexes of the four vertexes, so that the face (the head) C2 of the fighter C2 is represented by the set of polygons forming the hexahedron.

The respective patterns (texture) of a front part, a back part, right and left side face parts, a plane part and a bottom face part which form the respective expressions of an actual fighter are previously recorded by a video camera or the like, or separately formed, and they are stored in the ROM 203.

Figure 10B:
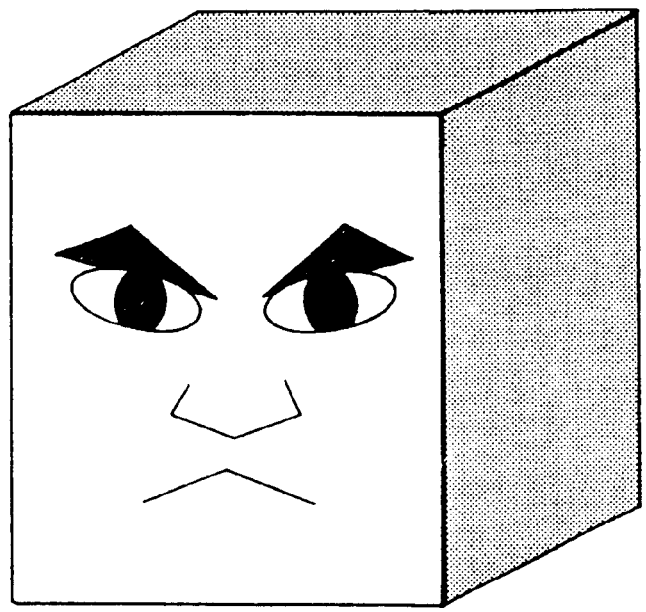

Thus, in step 502, the textures of the expressions, or the textures of the respective right side face and left side face parts, the back face part, the top part of the head or the like are mapped on the polygons of relevant addresses. Further, in this step, it is also decided whether the mapping of the textures on all the polygons, on the six faces in this case, is finished or not. Thus, the head of the fighter C2 whose expression is exhibited is formed, as illustrated in FIG. 10(b). Herein, in order to simplify the representation of the drawings, an example, is shown, in which the texture (the pattern of the face) is affixed only to the polygon of the front face of the head and the textures on other faces are not shown.

Then, the main CPU 201 fetches operating data from the sub CPU 204 and decides whether the operating data exists or not (step 503). When the operating data exists (step 503; YES), the main CPU 201 specifies the direction, strength, speed or the like of the operating data, contents of a punch command (including a protective command), etc. in step 504. Then, when it is decided (step 505;YES) that an attack command is input based on the result of the processing (step 504), the main CPU 201 reads the coordinate of the punch of the fighter C1 in step 506. Subsequently, the main CPU 201 reads the coordinate of the head of the fighter C2 who is a rival in step 507. Whether these coordinates coincide with each other or not is decided (step 508). This decision corresponds to the decision of collision of the fighters C1 and C2.

When these coordinates coincide with each other (step 508;YES), the decision of collision of the fighters C1 and C2 is affirmed, so that it is decided that the punch of the fighter C1 (character in the player side) strikes the face of the fighter C2 (character in the rival side). Thus, in order to proceed to a deforming processing, "1" is set to the flag FLG (step 509).

The main CPU 201 judges a first punch and a second punch in step 509. In the present embodiment, in order to simplify an explanation, only two kinds of punches will be explained. Further, in the present embodiment, the invalid operating degree gives an influence to a processing for decreasing the effect of the punch. It is to be noted that the value of the life counter may be lowered without decreasing the effect of the punch in such a way.

Firstly, when the first punch strikes the fighter (step 510;1P), a processing of a step 511 is carried out. In step 511, when the value of the invalid operating degree storing area is not more than a predetermined value, the main CPU 201 decides that the joy sticks 41am and 41ah hardly make an movement which is not based on the rule of the boxing. Then, the main CPU 201 carries out processings after step 512.

Figure 11A:
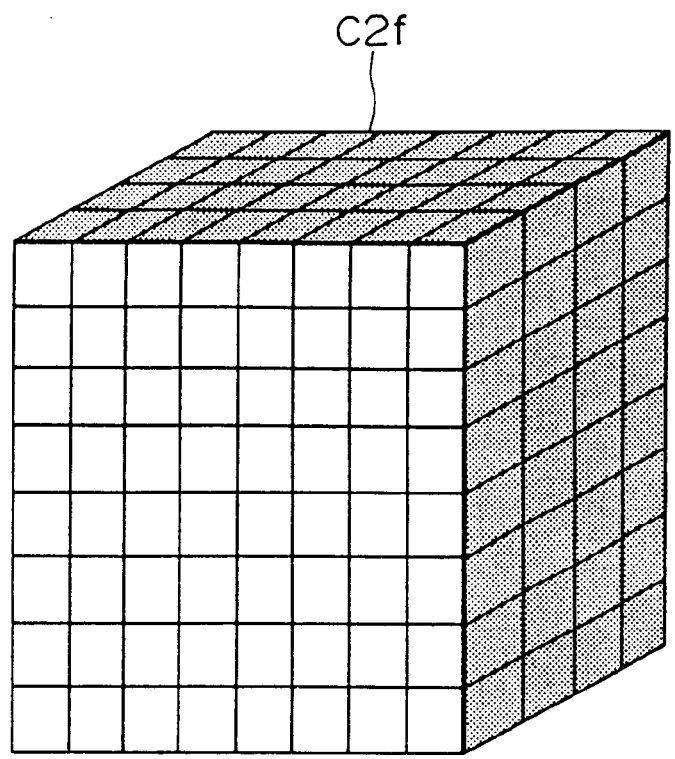
FIG. 11 is an explanatory view of the operation of the polygon number increasing means of the above mentioned embodiment.

In step 512, the main CPU 201 increases the number of polygons forming each face of the face (the head) C2f of the fighter C2 composed of the minimum number of polygons. Thus, as shown in FIG. 11(a), each face of the face (head) C2f composed of six polygons to which rectangular shapes (rectangles) are respectively assigned is not composed of one polygon but composed of a plurality of polygons arranged in 8 (column)×8 (row).

Still further, the respective addresses of the plurality of polygons of each face are specified and these addresses and the deforming data of the polygons are tabulated for every punch (the direction of a punch, the kind of a punch, the intensity of a punch). Many tables are stored in the ROM 203. Further, after step 512, which table the deforming data is fetched from is designated depending on the kind of a punch, the direction and intensity of a punch, the kind of the fighter, etc.

Next, the main CPU 201 fetches the deforming data of the polygon from a deforming table, for each address of each polygon forming a part of the face (the head) C2f. Then, the main CPU 201 deforms or transforms the texture of the expression of the face in the part corresponding to the address and maps the texture on the polygon corresponding to the address (step 513). The deformation of the polygon is enabled by setting the four vertexes of the polygon. In this case, such deforming data with many polygons, which are merely provided with four vertexes, arranged on each face of a hexahedron is obtained.

Figure 11B:
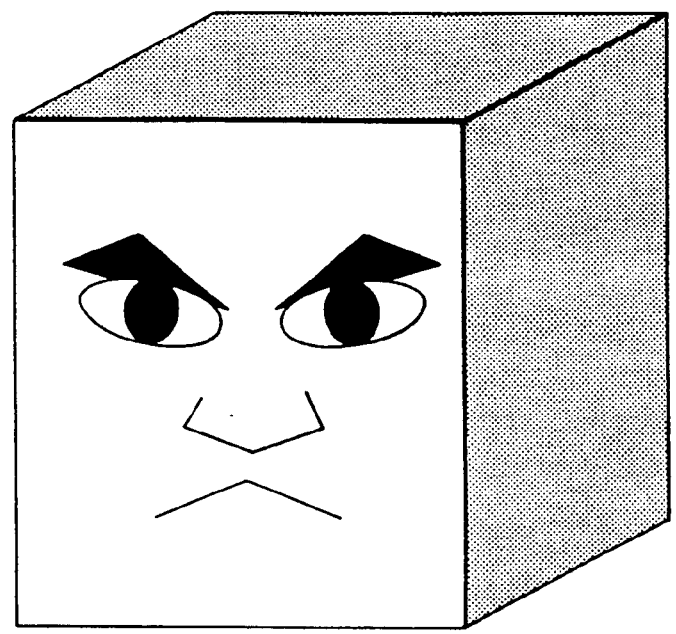

Then, the main CPU 201 decides whether a mapping is finished on all the polygons of the face (the head) C2f based on the deforming data or not (step 514). When the mapping processing of texture is not finished on all the polygons (step 514;NO), the mapping processing is continued (step 513, 514). When the mapping of texture is finished on all the polygons (step 514;YES), an ordinary face is displayed on a part of the hexahedron, as illustrated in FIG. 11(b). Then, the main CPU 201 decreases a predetermined value from the data of the life counter for the fighter C2 in step 515, then, updates the read address of the ROM 203 or the read address of the table in step 516 and passes this processing.

Figure 12A:
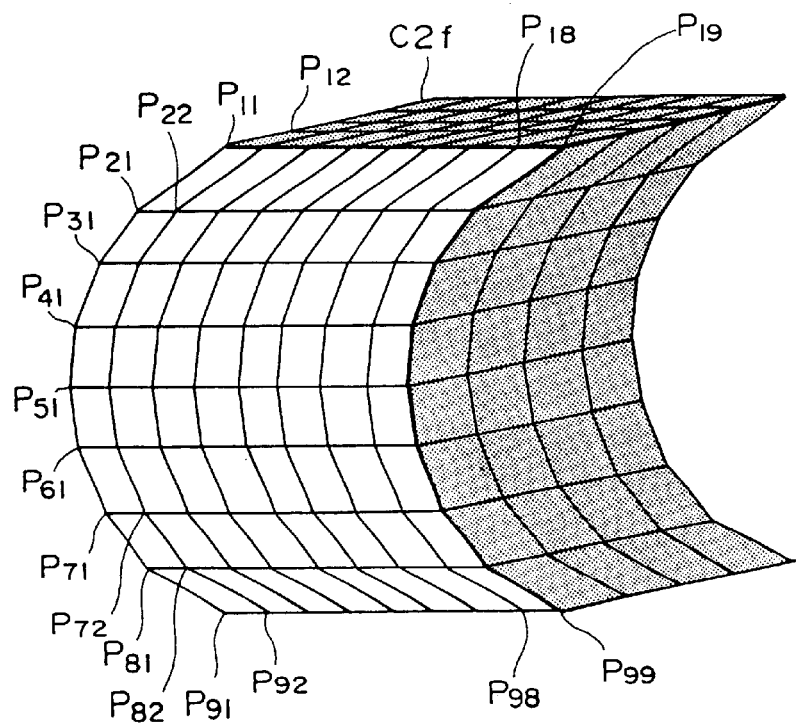
FIG. 12 is an explanatory view of the operation of the polygon number increasing means of the above mentioned embodiment.

When the main CPU 201 enters again this routine, the main CPU 201 reads deforming data from the predetermined address of a predetermined deforming table in step 520, since the flag FLG is set to "1". This deforming data is obtained, as shown in FIG. 12(a), as the respective addresses P11, P12, P21, P22. . . ,P81, P82, P91, P92 . . . , P18, P19, P28, P29 . . . , P88, P89, P98, P99 of respective polygons of minimum units.

Thus, the main CPU 201 selects the textures of the expression caused by the punch and deforms or transforms them. The main CPU 201 maps the respectively deformed textures on the respectively relevant addresses P11, P12, P21, P22, . . . ,P81, P82, P91, P92, . . . ,P18, P19, P28, P29, . . . , P88, P89, P98, P99. Thus, as illustrated in FIG. 11(b), the hexahedron composed of many polygons is distorted and deformed.

Next, the main CPU 201 decides whether all the textures are completely mapped on the respective addresses or not (step 522). When the mapping of all the textures is finished (step 522;YES), whether all the data of corresponding deforming tables is read or not is decided (step 522). When it is not read (step 523;NO), the read addresses of the ROM 203 and the deforming tables are updated (step 516).

Figure 12B:
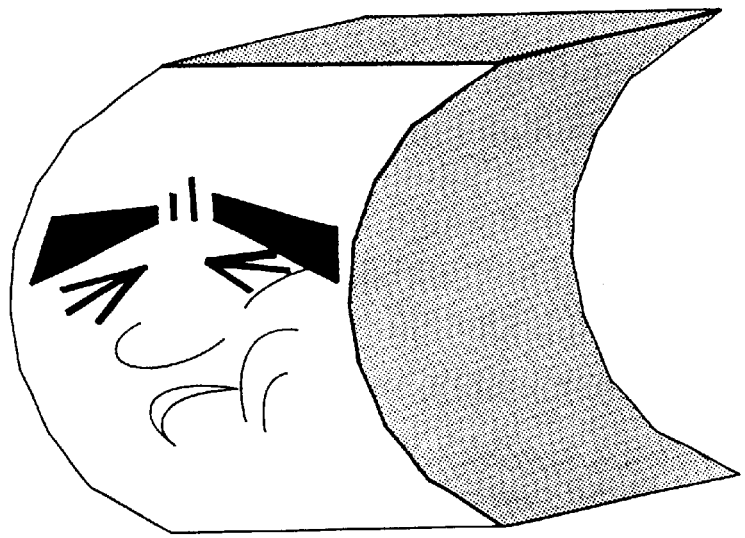

Every time this routine is passed, the data of the deforming table in an address updated state (steps 500, S520, S521, S522), and the deforming data is obtained one by one. As a result, the distorted face (the head) C2f is displayed. Thus, as shown in FIG. 12(b), the head and expression in a distorted state are displayed. When the deforming data of the deforming table is completely read (step 523;YES), the deformation or transformation of the face (the head) is finished so that the face is returned to an original state. Therefore, the main CPU 201 sets the flag FLG to "0" and proceeds to step 516.

In the meantime, when the punch is a first punch (step 510;1P) and the invalid operating degree is large (step 511;YES), the main CPU 201 carries out a processing for reading the data of a second deforming table the amount of deformation of which is small (step 525).

In step 525, the main CPU 201 increases the number of polygons forming the face (the head) C2f of the fighter C2 composed of the minimum number of polygons. As illustrated in FIG. 11(a), each face of the polygons forming the hexahedron is represented by many polygons. Then, in step 526, the textures of expression are mapped on the deforming data of the respective polygons. Then, the main CPU 201 decides whether the mapping is finished on all the polygons or not (step 527). Thus, as shown in FIG. 11(b), an ordinary face is displayed on a part of the hexahedron.

Then, the main CPU 201 decreases an ordinary value from the data of the life counter for the fighter Cf, updates the read address of the ROM 203 and the read address of the second deforming table in step 516, and then passes this processing.

Even when the punch is the first punch, as described above, which can usually give a great damage to the fighter C2, it is regarded as an ordinary punch, if the invalid operating degree is large.

When the punch is a second punch (step 510; 2P), and the invalid operating degree is small (step 529;YES), the main CPU 201 performs the processings of step 525 to step 528, step 500, step 520 to step 534). Thus, as shown in FIG. 11(*a*), each face of polygons forming the hexahedron is changed to many polygons (divided), and then, an ordinary face is displayed on a part of the hexahedron, as illustrated in FIG. 11(*b*). The face (the head) C2*f* of the hexahedron composed of many polygons is distorted and the expression caused by the distortion is displayed at the same time. In this case, since the second deforming table is used, the degree of deformation is smaller than shown in FIG. 12.

Figure 13:
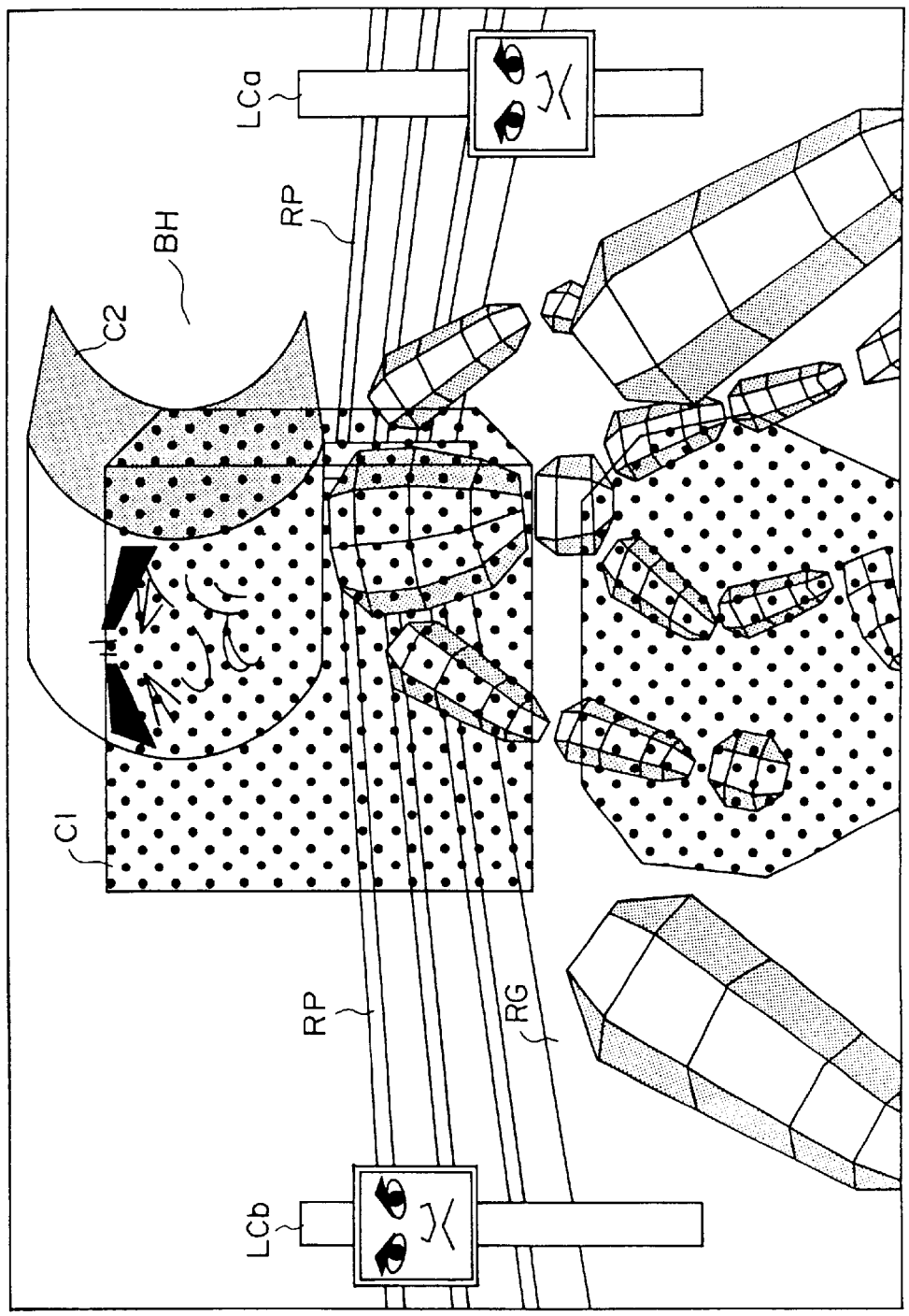
FIG. 13 is a view illustrating an image plane displayed in accordance with the operations of the polygon forming means and the polygon number increasing means of the above described embodiment.
Figure 18:
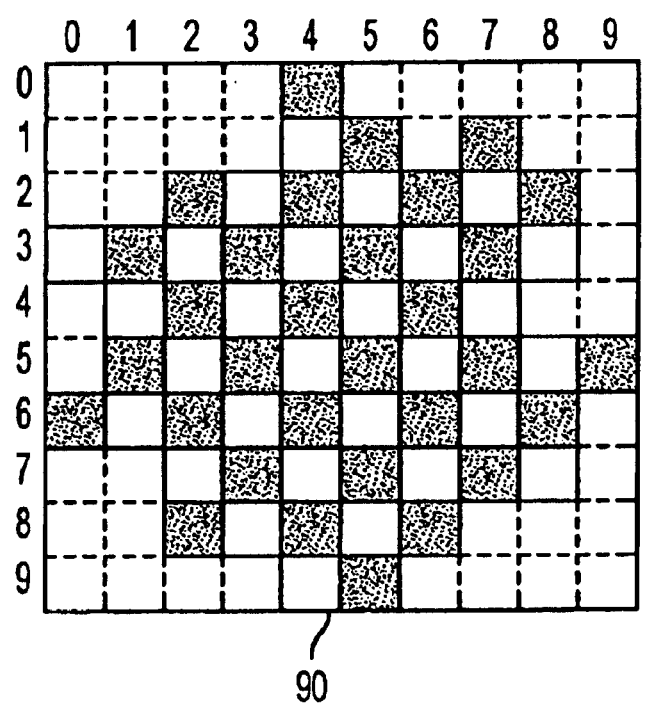
FIG. 18 is an explanatory view for explaining the operation of a mesh processing of the above mentioned embodiment.

Although, in the above stated processing, the processing for the fighter C2 is only explained, the head and breast part of the fighter C1 is perspectively processed and the arm or the like of the fighter C1 is displayed in an ordinary polygon processing on the display 3*a*, as illustrated in FIG. 13. It is to be understood that, when the arm or the like is overlapped on the fighter C2, the arm may be subjected to a perspective processing. A mesh processing is one method included in the perspective processing. In this mesh processing, when a polygon 90 having, for example, four vertexes, is composed of, for example, 9 dots on an X-axis and a Y-axis, respectively, as illustrated in FIG. 18, pixels which have values of even numbers obtained from the expression: the coordinate value of the X-axis+the coordinate value of the Y-axis=S are only represented and the representation of pixels having values of odd numbers as S is skipped (not written). In such a way, the mesh processed polygons are obtained.

Since the respective fighters C1 and C2 or the like are displayed in the forefront part of the display 3*a* in accordance with the decided result of the priority of the polygons. Since the priority of the polygons of the fighter C2 is located in the second place, the fighter C2 is displayed in a position behind the fighter C1 and ahead of the rope-RP. Further, since the head and breast part of the fighter C1 undergo a mesh processing, even when the fighter C1 is displayed in the front side of an image plane, the shape and look of the fighter C2 can be both seen. Further, since the polygons of the rope RP have a third priority, the rope RP is displayed in the rearmost side. Still further, the ring RG is displayed by using a rotating scroll processing. Still further, since the life counters LCa and LCb are displayed by employing scroll images, they are always displayed in the right and left parts of the display 3*a*. An audience or the like, which is not shown, is displayed as a background BH.

Then, when the punch is a second punch (step 509; 2P), and the invalid operating degree is large (step 529;NO), the main CPU 201 updates the read address of the ROM 203 (step 516) and then, passes this processing. Specifically stated, when the invalid operating degree is large, it is decided that an operation based on the rule of the boxing is not input. Therefore, even if an effective punch strikes an opponent, the main CPU 201 will consider it invalid or decrease its power.

On the contrary, when the coordinate of the punch of the fighter C1 does not coincide with the coordinate of the head of the fighter C2 (step 508;NO), the main CPU201 reads other coordinate of the opponent fighter C2 to be fought with in step 531. Then, the main CPU 201 compares the coordinate of the fighter C2 with the coordinate of the punch of the fighter C1 (step 532). When both the coordinates coincide with each other, it may be decided that the punch of the fighter C1 strikes the body of the opponent fighter C2 to be fought with (step 532;YES), the deforming processing of the fighter C2 is not carried out and a processing for applying damage to the opponent fighter C2 is simply carried out. Then, the main CPU 201 decreases an ordinary value from the data of the life counter for the fighter C2 in step. 533, updates the read address of the ROM 203 (step 516) and passes this processing.

Further, in the case of protection (step 505; protection), the main CPU 201 reads the coordinate of the punch of the opponent fighter C2 to fight with (step 541). Further, the main CPU 201 reads the coordinate of the hand of the fighter C1 in step 542. Then, when they coincide with each other (step 543;YES), a processing is carried out by deciding that the fighter succeeds in protection (step 544).

On the other hand, when both the coordinates do not coincide with each other, in protection, (step 543; NO), the main CPU 201 reads the coordinate of other part of the fighter C1 step 545). When the coordinate of the punch of the opponent fighter C2 coincides with the coordinate of other part of the fighter C1, it is decided that the punch of the opponent fighter C2 to be fought with strikes the fighter C1. In this case, the main CPU 201 carries out, for example, a processing for knocking the fighter C1 down depending on the strength of the punch of the opponent fighter (step 547).

Then, the main CPU 201 decreases the value of the life counter of the fighter C1 depending on the effectiveness of the punch of the opponent fighter to be fought with (step 548), updates the read address of the ROM 203, and passes this processing.

When there is no operating data (step 503; NO), if the opponent fighter C2 extends a punch (step 550;YES), processings of step 541 to step 548 are carried out.

Further, when there is no operating data (step 503; NO) and there is no supply of punch from the opponent fighter C2 (step 550; YES), the main CPU 201 carries out no processing, updates the read address of the ROM 203 (step 518), and passes this processing.

The above mentioned respective processing steps are carried out, so that a processing load can be lowered by usually performing a display with the small number of polygons. When the fighter C2 receives the punch of the fighter C1, polygons forming the hexahedron which constitutes the face or the like are divided into many polygons, so that the expression of the face or the like can be changed. Thus, an amusing game atmosphere can be provided. Further, when an ordinary face or the like which is not deformed is displayed, the face (the head) C2*f* is composed of a hexahedron, and thus, the face which the punch does not strike can be constituted of the minimum number of polygons.

In the above described embodiment, although the addresses of the respective polygons are specified, and these addresses and the deforming data of the polygons are tabulated, from which the deforming data is obtained depending on the kind of punch, so that the deforming data of the head or the like of the fighter C2 is obtained, it is to be noted that the deforming data may be obtained by calculation.

Operation of Image processed Surplus Power Display Means

Figure 14:
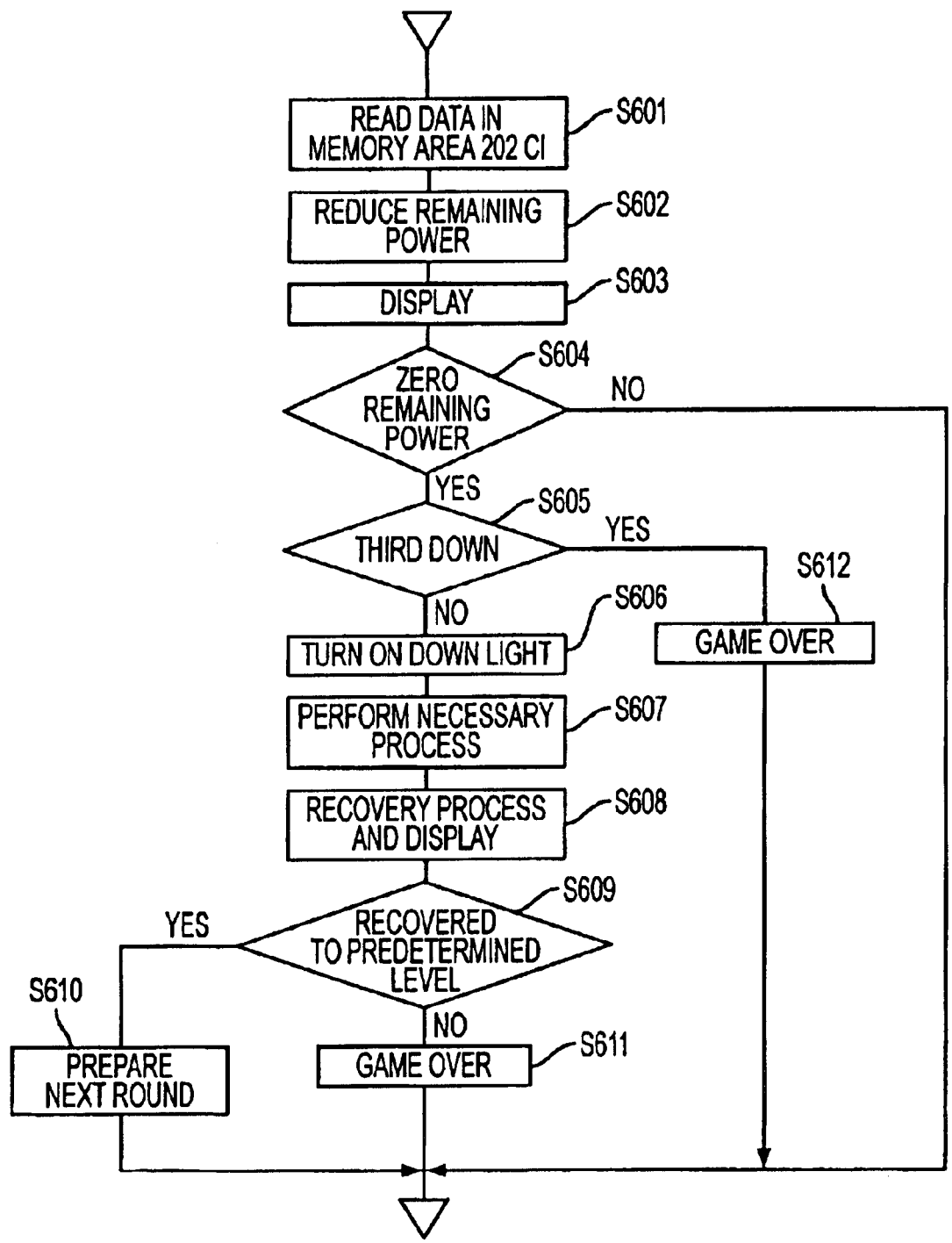
FIG. 14 is a flowchart for explaining the operation of an image processed surplus power display means of the above mentioned embodiment.
Figure 15:
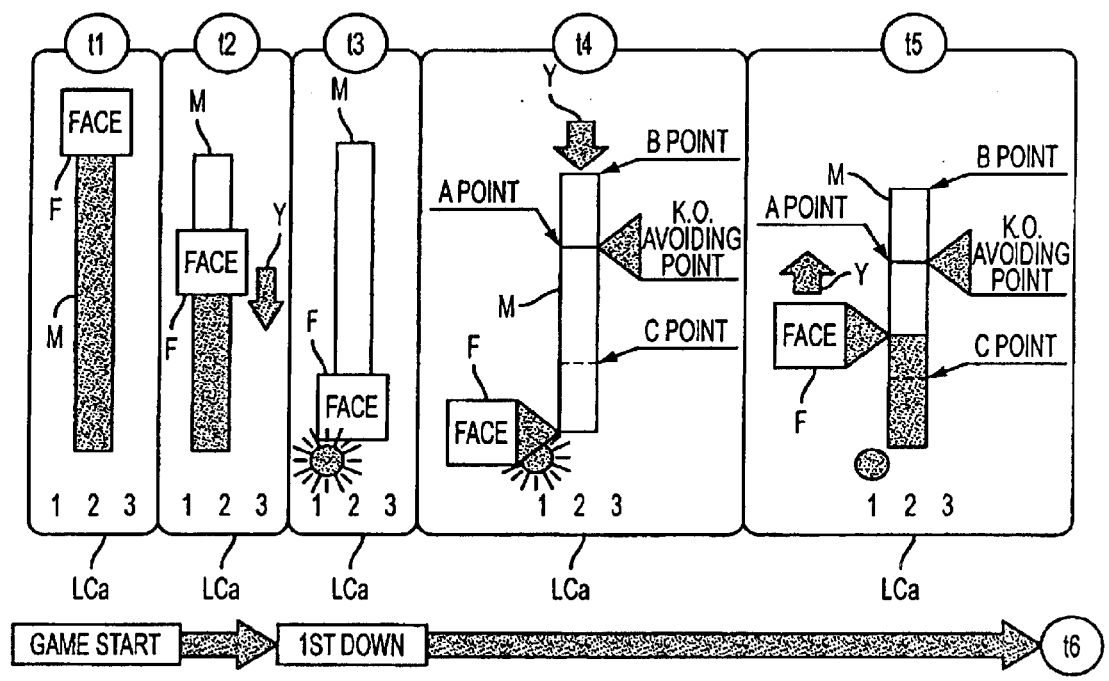
FIG. 15 is an explanatory view showing display examples of a life counter obtained by the image processed surplus power display means of the above described embodiment.
Figure 16:
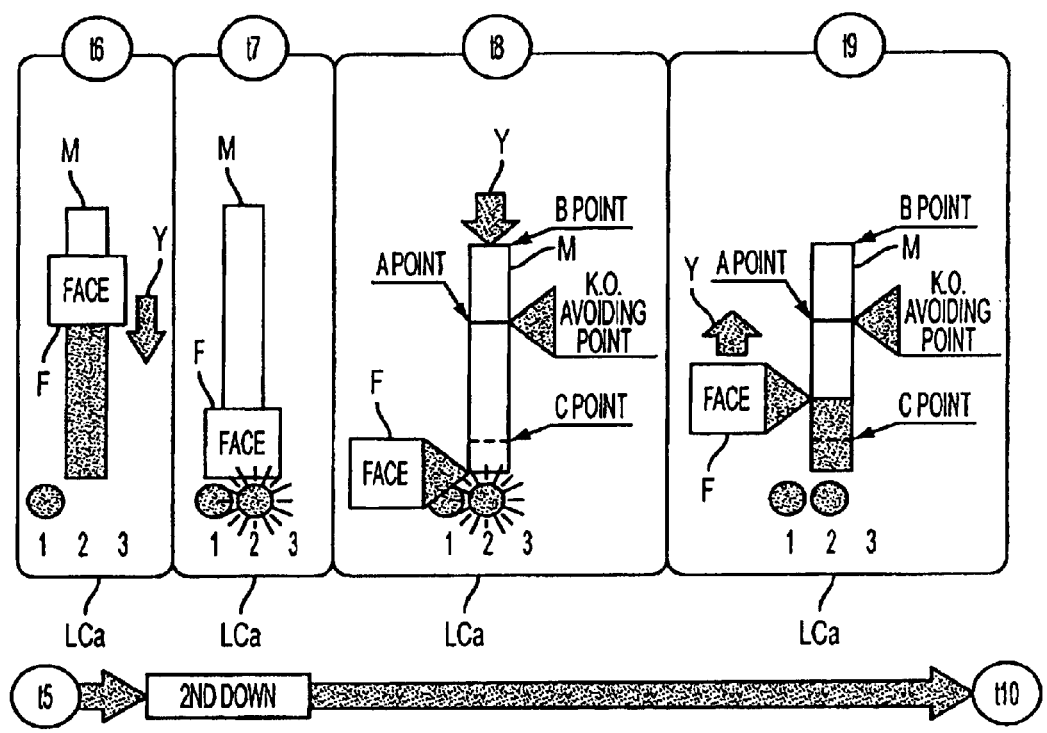
FIG. 16 is an explanatory view showing display examples of a life counter obtained by the image processed surplus power display means of the above mentioned embodiment.
Figure 17:
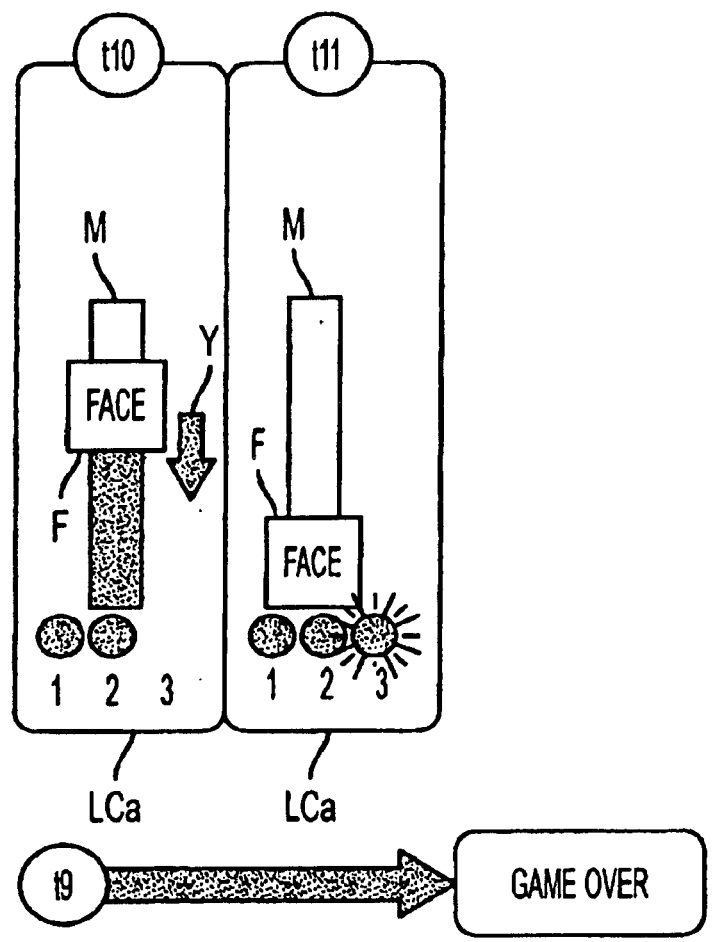
FIG. 17 is an explanatory view showing display examples of a life counter obtained by the image processed surplus power display means of the above mentioned embodiment.

In the next place, referring to FIGS. 14 to 17, a display processing of the life counters LCa and LCb (see FIG. 13) of the fighters C1 and C2 and a, data processing required for the display processing will be described. FIG. 14 is a flowchart for an image processed surplus power display processing. FIGS. 15 to 17 are explanatory views showing examples of the display states of the life counters LCa and LCb. Although, in FIGS. 15 to 17, the life counter LCa is only displayed, it is to be understood that the life counter LCb may be similarly displayed. For simplifying the explanation, the life counter LCa is only displayed and explained in FIGS. 15 to 17. In FIGS. 15 to 17, the life counter LCa comprises a meter M for indicating a whole surplus power, a face F as a means for displaying a remaining surplus power relative to the whole surplus power, numerals ((1), (2), (3)) designating rounds and a display member flashed or lighted above these numerals.

Initially, when a game or session is started, since the whole surplus power for the fighter C1 is stored in the storing area 202C1, the main CPU 201 reads data from the storing area 202C1 (step 601).

Then, when the fighter C1 receives a punch (as an image processing progresses) and the data concerning the life counter is lowered, in accordance with the processing of the above mentioned step 313, the main CPU 201 decreases the remaining surplus power based on the value (step 602).

In step 603, display data is formed from the data of the meter M in the previous step and the data of remaining surplus power. Thus, the data for indicating the meter M is produced and the data of the remaining surplus power relative to the whole surplus power is formed. Since the data of the meter M is first equal to the data of the remaining surplus power, the life counter LCa has the meter M and the face F which are displayed on the same position (game start (time 1)).

Then, in step 604, the main CPU 201 decides the relation of the face F (existing surplus power) relative to the meter M (whole surplus power) (step 604).

When the face F (existing surplus power) does not reach the bottom of the meter M (whole surplus power) (step 604;NO), the main CPU 201 passes this processing. Accordingly, a display is made in such a manner that the remaining surplus power is simply reduced. That is, when the processings of steps 601 to 604 are repeated, only the face F is lowered (time t1, t2 in FIG. 15).

When the face F (existing surplus power) reaches the bottom of the meter M (whole surplus power)(step 604; YES), whether it means a third down or not is decided in step 605. When it is not a third down (step 605;NO), the part of the numeral "1" of the life counter LCa is flashed (step 606). Thus, the fighter C1 makes a first down. Further, the life counter LCa indicates the first down, so that the upper part of the numeral "1" is displayed in a flashed state and the face F is displayed in the lowermost position, as shown in (t3) of FIG. 15.

Before a referee begins to count, the main CPU 201 decreases a constant value from the value of the storing area 202C1 in step 607. Further, in this step, the value of the storing area 202C1 is read, the data of a knock out avoiding point (KO) is formed or corresponding data is read from a memory and data displayed under a state in which the position of the face F is spoken from the meter M is formed. This data is displayed, so that the face F is displayed in a position separated from the meter M, as illustrated in FIG. 15 (t4). Further, as shown in the same figure, an A point is displayed in the meter M and a B point is displayed as shown by an arrow Y. This B point is shortened more than that at the time t1 (the meter M is displayed in a short form). Then, a C point is set or determined in terms of software, so that the knock-out avoiding point (KO) is displayed.

Further, the physical strength of the fighter C1 is recovered in accordance with a predetermined recovery condition. A condition for finishing the count is that the face F reaches the A point within the count "ten". The C point is a forced motion generating point. Thus, as the physical strength recovers, the remaining surplus power is recovered (step 608). Further a display is made so as to raise the face F (step 608). Thus, as shown in FIG. 15(t5), the face F of the life counter LCa is raised as shown by an arrow Y. Then, when the face F enters the area of the B point or A to B points in the count of nine (step 609), the main CPU 201 inputs a command for entering again a processing for a next round (step 610) or session. When the face does not enter the area of the B point or the A to B points in the count nine (step 609; NO), the main CPU 201 carries out, for example, a processing of game-over (step 611).

When entering a second round or session, the data of the meter M is read in step 601. In step 602, the remaining surplus power is reduced. When these data are displayed in step 603, the face F is displayed in a state where the face is lowered in the direction shown by an arrow Y, as illustrated in FIG. 16(t6).

Then, when the steps 604 and 605 are passed and there is no remaining surplus power, the life counter LCa indicates a second down, the upper part of the numeral "2" is displayed in a flashed state and the face F is displayed in the lowermost position (step 606), as illustrated in FIG. 16(t7).

Before the referee begins to count, the whole amount of the life counter LCa is decreased, the knock-out avoiding point (KO) is output and the position of the face F is changed. Thus, as shown in FIG. 16(t8), the face F is displayed in a separate position.

Further, the physical strength of the fighter C1 recovers, the main CPU 201 carries out a displaying processing for raising the face F (step 608). Thus, as shown in FIG. 16(t9), the face F of the life counter LCa is raised as shown by an arrow Y. Then, when the physical strength of the fighter C1 recovers (step 609), the main CPU 201 carries out a command for entering again a next round (step 610) or session.

When entering the third round or session, the main CPU carries out again the processings of the steps 601 to 604. Thus, the face F is displayed on the display 3a in a state in which the face is lowered in the direction shown by an arrow Y, as shown in FIG. 17 (t10).

Then, when there is no remaining amount (step 604), the life counter LCa indicates a third down, the upper part of the numeral "3" is displayed in a flashed state and the face F is displayed in the lowermost position, as shown in FIG. 17(t11). In step 612, a game-over is displayed. When there is the remaining surplus power, the main CPU 201 carries out no processing and passes this processing.

The processings of the image processed surplus power display means are carried out by executing the above described processing steps. The processings include a display processing for the whole surplus power by a whole surplus power display means, a display processing for the remaining surplus power relative to the whole surplus power by a remaining surplus power display means and a processing for gradually decreasing the whole surplus power by a whole surplus power changing means as an image processing progresses.

Since the display processings of the life counters LCa are those described above, the game or session development which has an actual feeling in view of the damage or the like of the fighters C1 and C2 and be enjoyed.

In the explanation of the present embodiment, the polygon data refers to groups of data of the relative or absolute coordinates of the respective vertexes of a polygon (polygon: mainly, rectangle or triangle) composed of a set of a plurality of vertexes.

Although, in the present embodiment, as a device to which the data processor of the present invention is applied, a game device is exemplified, the data processor of the present invention is not necessarily limited thereto, the data processor may be individually embodied, may be installed integrally in a simulation system or the like and can provide an image full of a feeling like being present at any place with a smaller amount of computation.

The above described ROM 203 is equivalent to the above mentioned recording medium. The ROM 203 is not only installed on the game device main body, but it may be, of course, newly connected and applied to the game device from outside.

Although, in the above description, an explanation was made for a three-dimensional image processing, it is to be understood that the present invention may be applied to a display processing of sprite.

Industrial Applicability

As mentioned above, according to the present invention, the number of polygons forming a display member is increased, when the display member is deformed or transformed and the deformed display member is displayed. Therefore, as the invention according to claim 2, at least a part of the display member is constituted of the minimum number of polygons, and when the part of the display member does not need to be deformed nor displayed, the number of polygons is maintained, and when it needs to be deformed, the number of polygons is increased. Accordingly, when the part does not to be deformed, the extra number of polygons can be applied to the display of other display members. Therefore, the limited number of polygons can be effectively used.

Further, the number of polygons is increased, and thus, such a deformation can be displayed or a more specifically deformed image can be formed. Still further, when the display member does not need to be deformed, an image processing load can be decreased, and the display member can be constituted of many polygons as required and various displaying manner can be realized.

Further, according to the present invention, a part of the display member is formed in the shape of a polyhedron each face of which is composed of one polygon, and each face of the polyhedron is increased to be composed of a plurality of polygons, when a part of the display member is deformed and the deformed display member is displayed. Therefore, the number of polygons can be reduced as many as possible by forming a simply polyhedron, and when the polyhedron needs to be deformed and displayed, the number of polygons of each face is increased and various displays can be achieved.

Still further, according to the present invention, the display member comprises first and second characters respectively simulating the body, the collision of the head of the first character with the second character is decided, so that a case in which the head needs to be deformed is assuredly grasped, the head of the first character is formed in the shape of a hexahedron each face of which is composed of one polygon, and further, when the decision of collision is affirmed, the number of polygons of each face of the hexahedron is increased so that the deformation of the head can be displayed. Therefore, the display can be diversified.

Still further, according to the present invention, each face of the head of the character is formed in a rectangular shape which can be composed of one polygon, so that the number of polygons of each face of the head can be minimized, when the deformation of the head is not needed.

Still further, according to the present invention, a whole surplus power is gradually decreased as the image processing progresses so that the result of the image processing influences a surplus power for the image processing. The whole surplus power is gradually decreased, so that a damage actually accumulated on the display member can be accurately reproduced upon image processing in, for example, a fighting game, and the image processing filled with a realistic sense can be provided.

Further, according to the present invention, since values obtained by gradually decreasing the whole surplus power are stored in a storing means, and the whole surplus powers corresponding to the values are gradually read from the storing means in accordance with an image processing state, the whole surplus power can be assuredly changed depending on the image processing state and a game atmosphere full of, for example, a sense of reality can be provided.

Still further, according to the present invention, the whole surplus power for the image processing is supplied as a life count value to the character as the display member and an audience can previously know the residual life of the character which can be controlled by himself or herself, for example, a game atmosphere full of a sense of reality can be enjoyed.

Still further, according to the present invention, since the display member is constituted of polygons, and a part of the polygons of the display member located in the front side of a viewpoint is perspectively or transparently processed, when the image of the display member viewed from a predetermined viewpoint is formed, the display member in the front side can be perspectively or transparently seen by an operator. Thus, even when the display member is formed in a three-dimensional coordinate system, an ensured operation and an image processing atmosphere full of a sense of reality can be realized, while the display member of an opponent side and the display member of an operator or player side are simultaneously recognized.

Still further, according to the present invention, the above mentioned perspective or transparent display is effectively realized by a mesh processing. Further, since whether an operation according to a predetermined rule like a rule in the case of a fighting game is input to an operating means or not is decided and the degree of an image processing which is applied to the display member is suppressed, the operation of the operating means which does not meet the predetermined rule can be prevented and an image processing atmosphere like a game atmosphere full of a sense of reality can be provided.

Additionally, according to the present invention, a display means and the above mentioned image processor are provided, so that a game and play in which an effective image processing can be done can be provided, when a play simulating a reality such as a fighting game is achieved.

What is claimed is:

1. An image processor, comprising:
   image processing means for carrying out image processing of a virtual hand-to-hand fight between at least two display members, for displaying a display member motion of at least one of said display members based on an operating signal by a player; and
   image processed surplus power display control means for displaying a surplus power in the image processing on the display member as an image,
   wherein said image processed surplus power display control means includes whole surplus power display control means for displaying whole surplus power, display control means of a remaining surplus power relative to the whole surplus power and whole surplus power changing means for gradually changing the whole surplus power as the image processing progresses during a game or game session, and wherein said whole surplus power is reduced by a predetermined amount each time the player controlled character is knocked down and wherein said image processing means does not change the whole or surplus power between different games or game sessions for at least one display member being controlled by the player.

2. An image processor according to claim 1, further comprising storing means for storing values obtained by gradually decreasing the whole surplus power, said whole surplus power changing means gradually reading the whole surplus power corresponding to the values from said storing means in accordance with an image processing state so that the whole surplus power is decreased.

3. An image processor according to claim 1, wherein the whole surplus power in the image processing is a life count value given to a character as said display member.

4. A game device wherein a display member is operated pursuant to operations signals from the player and said game device progresses the game by displaying said display member on display means, said game device comprising:

existing surplus power calculating means, which includes whole surplus power setting means for setting the surplus power to said display member, for calculating the existing surplus power of said display member by adding or subtracting a prescribed surplus power from the whole surplus power of said display member when a prescribed condition occurs during the progress of the game; and game over means for finishing said game when said existing surplus power of said display member becomes a prescribed state, wherein when a prescribed condition during said game progress is fulfilled, said whole surplus power setting means sets, in a successively decreasing manner, the whole surplus power to said display member and wherein said whole surplus power is reduced by a predetermined amount each time the player controlled character is knocked down in a virtual hand-to-hand fight between at least two display members.

* * * * *